(12) United States Patent
Abotabl et al.

(10) Patent No.: US 12,414,109 B2
(45) Date of Patent: Sep. 9, 2025

(54) SKIPPED UPLINK CONFIGURED GRANT OCCASIONS IN SIDELINK TRANSMISSIONS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 474 days.

(21) Appl. No.: 17/822,072

(22) Filed: Aug. 24, 2022

(65) Prior Publication Data

US 2024/0073888 A1    Feb. 29, 2024

(51) Int. Cl.
*H04W 4/00*     (2018.01)
*H04W 72/1268*  (2023.01)
*H04W 72/21*    (2023.01)
*H04W 72/23*    (2023.01)

(52) U.S. Cl.
CPC ....... *H04W 72/1268* (2013.01); *H04W 72/21* (2023.01); *H04W 72/23* (2023.01)

(58) Field of Classification Search
CPC . H04W 72/1268; H04W 72/21; H04W 72/23; H04W 72/115; H04W 72/40; H04W 72/569; H04W 72/20; H04W 28/04; H04W 72/04; H04W 72/042; H04W 88/08; H04W 28/08; H04W 28/084; H04W 36/22; H04W 72/12; H04L 5/0007
See application file for complete search history.

(56) References Cited

U.S. PATENT DOCUMENTS

| | | | |
|---|---|---|---|
| 10,959,218 B2 | 3/2021 | Babaei et al. | |
| 12,108,398 B2* | 10/2024 | Wang | H04W 72/20 |
| 2020/0008183 A1 | 1/2020 | Chen et al. | |
| 2021/0274543 A1* | 9/2021 | Ryu | H04W 72/569 |
| 2022/0053550 A1* | 2/2022 | Li | H04W 72/23 |
| 2022/0216975 A1 | 7/2022 | Hwang et al. | |
| 2022/0217767 A1* | 7/2022 | Lee | H04W 4/40 |
| 2022/0304001 A1 | 9/2022 | Lee et al. | |
| 2024/0365361 A1* | 10/2024 | Salim | H04W 72/51 |

* cited by examiner

*Primary Examiner* — Phuongchau Ba Nguyen
(74) *Attorney, Agent, or Firm* — Procopio, Cory, Hargreaves & Savitch LLP/Qualcomm

(57) ABSTRACT

Aspects presented herein may enable a UE with an UL-CG to use resources associated with one or more UL transmissions for sidelink communications. In one aspect, a first UE transmits an indication of an UL-CG configuration including a set of periodic resources, where the UL-CG configuration corresponds to at least one allocated UL transmission for the first UE to a network node, where the indication is transmitted to at least one second UE. The first UE skips at least one UL transmission associated with the UL-CG configuration, where the skipped at least one UL transmission corresponds to a subset of the set of periodic resources. The first UE transmits a SL transmission to the at least one second UE using at least the subset of the set of periodic resources corresponding to the skipped at least one UL transmission associated with the UL-CG configuration.

27 Claims, 16 Drawing Sheets

```
ConfiguredGrantConfig ::=         SEQUENCE {
    frequencyHopping                  ENUMERATED {intraSlot, interSlot}    OPTIONAL,    -- Need S,
    cg-DMRS-Configuration             DMRS-UplinkConfig,
    mcs-Table                         ENUMERATED {qam256, qam64LowSE}      OPTIONAL,    -- Need S
    mcs-TableTransformPrecoder        ENUMERATED {qam256, qam64LowSE}      OPTIONAL,    -- Need S
    uci-OnPUSCH                       SetupRelease { CG-UCI-OnPUSCH }      OPTIONAL,    -- Need M
    resourceAllocation                ENUMERATED { resourceAllocationType0,
                                                  resourceAllocationType1, dynamicSwitch },
    rbg-Size                          ENUMERATED {config2}                 OPTIONAL,    -- Need S
    powerControlLoopToUse             ENUMERATED {n0, n1},
    p0-PUSCH-Alpha                    P0-PUSCH-AlphaSetId,
    transformPrecoder                 ENUMERATED {enabled, disabled}       OPTIONAL,    -- Need S
    nrofHARQ-Processes                INTEGER (1..16),
    repK                              ENUMERATED {n1, n2, n4, n8},
    repK-RV                           ENUMERATED {s1-0231, s2-0303, s3-0000}  OPTIONAL,-- Need R
    periodicity                       ENUMERATED {
        sym2,sym7,sym1x14,sym2x14,sym4x14,sym5x14,sym8x14,
        sym10x14, sym16x14, sym20x14,sym32x14, sym40x14, sym64x14, sym80x14, sym128x14, sym160x14,
        sym256x14, sym320x14, sym512x14,sym640x14, sym1024x14, sym1280x14, sym2560x14, sym5120x14, sym6,
        sym1x12, sym2x12, sym4x12, sym5x12, sym8x12, sym10x12, sym16x12, sym20x12, sym32x12, sym40x12,
        sym64x12, sym80x12, sym128x12, sym160x12, sym256x12, sym320x12, sym512x12, sym640x12, sym1280x12,
        sym2560x12
    },
```

FIG. 9

SKIPPED UPLINK CONFIGURED GRANT OCCASIONS IN SIDELINK TRANSMISSIONS

TECHNICAL FIELD

The present disclosure relates generally to communication systems, and more particularly, to a wireless communication involving sidelink transmissions.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus transmits an indication of an uplink (UL)-configured grant (CG) (UL-CG) configuration including a set of periodic resources, where the UL-CG configuration corresponds to at least one allocated UL transmission for the first user equipment (UE) to a network node, where the indication is transmitted to at least one second UE. The apparatus skips at least one UL transmission associated with the UL-CG configuration, where the skipped at least one UL transmission corresponds to a subset of the set of periodic resources. The apparatus transmits a sidelink (SL) transmission to the at least one second UE using at least the subset of the set of periodic resources corresponding to the skipped at least one UL transmission associated with the UL-CG configuration.

In an aspect of the disclosure, a method, a computer-readable medium, and an apparatus are provided. The apparatus receives an indication of an UL-CG configuration including a set of periodic resources, where the UL-CG configuration corresponds to at least one allocated UL transmission for a first UE to a network node. The apparatus receives a SL transmission from the first UE via at least a subset of the set of periodic resources associated with the UL-CG configuration.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 9 is a diagram illustrating an example configured grant (CG) configuration in accordance with various aspects of the present disclosure.

DETAILED DESCRIPTION

Figure 1:
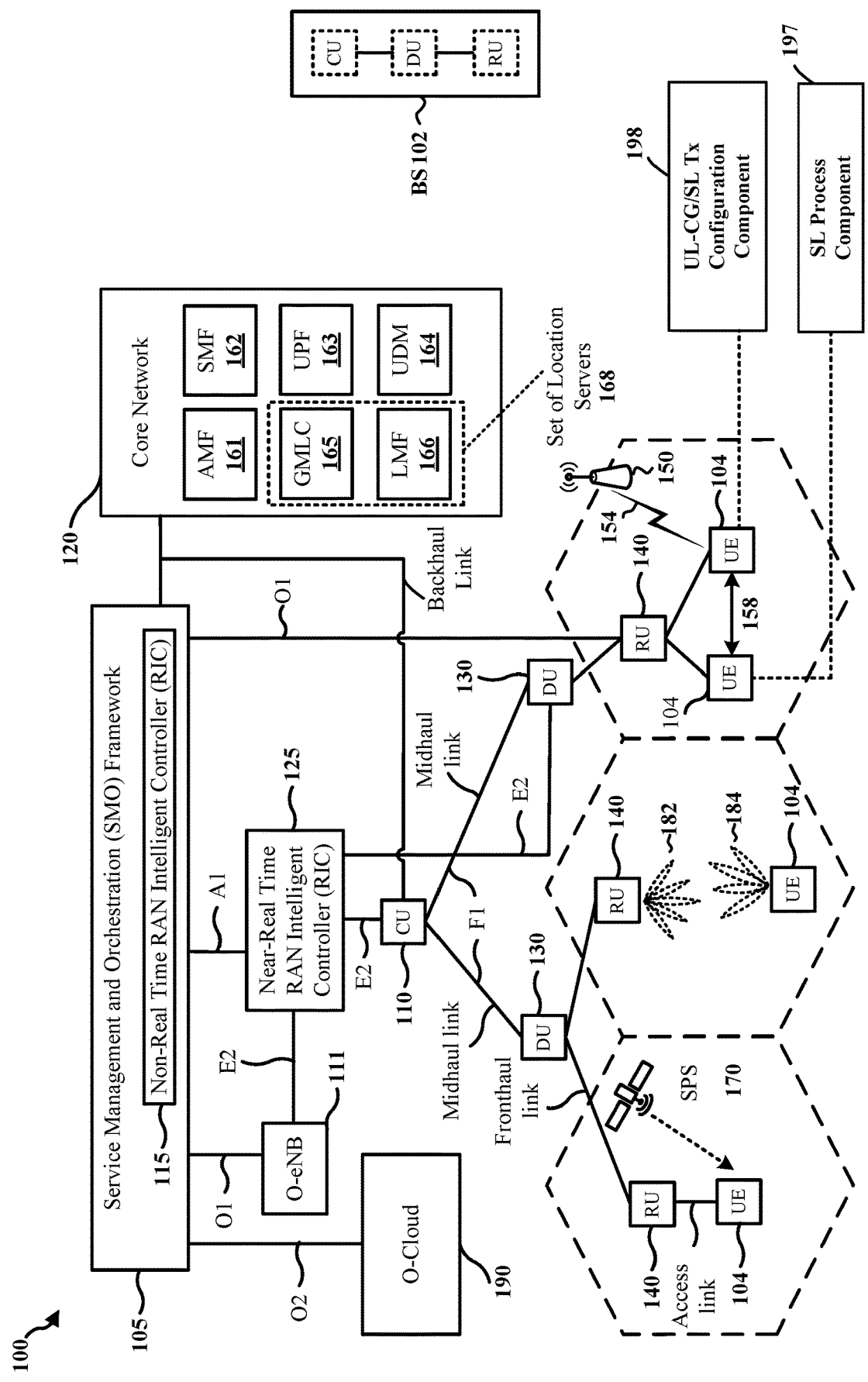
FIG. 1 is a diagram illustrating an example of a wireless communications system and an access network.

Aspects presented herein may improve resource utilization for a communication network. Aspects presented herein may enable a user equipment (UE) with an uplink (UL)-configured grant (CG) (UL-CG) to use resources associated with one or more UL transmissions for sidelink communications. For example, if a UE with an UL-CG determines to skip an UL transmission associated with the UL-CG (e.g., when the UL buffer is empty for the UE), the UE may use the resource associated with the skipped UL transmission for communicating with another UE over the sidelink (e.g., for transmitting a sidelink message to that UE or for receiving a sidelink massage from that UE, etc.). In addition, if other UEs in the sidelink are aware of the UE's UL-CG, they may be configured to monitor the resources associated with the UL-CG for sidelink transmission from the UE, which may reduce power consumption at these UEs.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an AI interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to transmit an indication of an UL-CG configuration including a set of periodic resources, where the UL-CG configuration corresponds to at least one allocated UL transmission for the first UE to a network node, where the indication is transmitted to at least one second UE; skip at least one UL transmission associated with the UL-CG configuration, where the skipped at least one UL transmission corresponds to a subset of the set of periodic resources; and transmit a SL transmission to the at least one second UE using at least the subset of the set of periodic resources corresponding to the skipped at least one UL transmission associated with the UL-CG configuration (e.g., via the UL-CG/SL Tx configuration component 198).

In certain aspects, the UE 104 may be configured to receive an indication of an UL-CG configuration including a set of periodic resources, where the UL-CG configuration corresponds to at least one allocated UL transmission for a first UE to a network node; and receive a SL transmission from the first UE via at least a subset of the set of periodic resources associated with the UL-CG configuration (e.g., via the SL process component 197).

Figure 2:
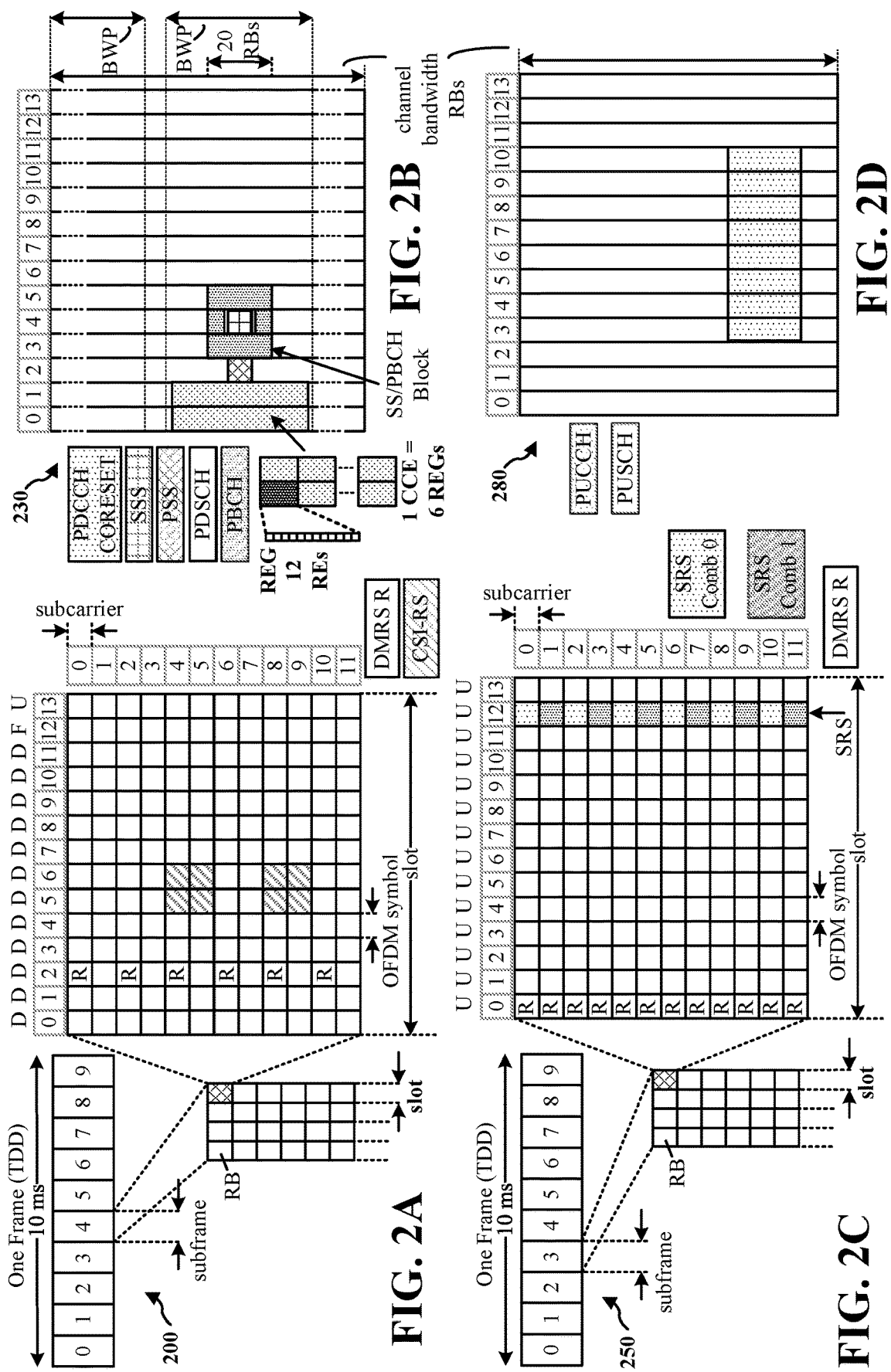
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^\mu \cdot 15[KHz]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu *15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
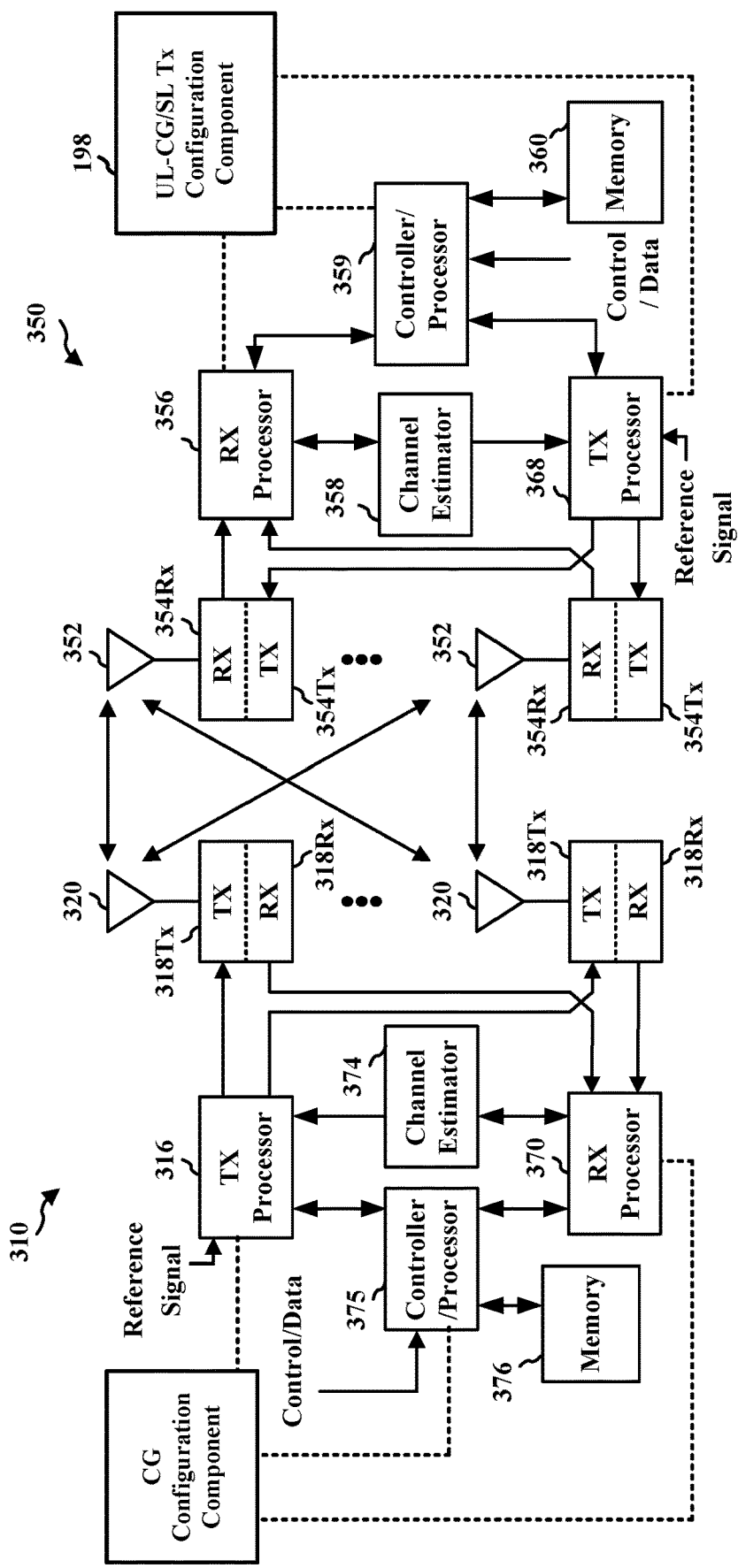
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the UL-CG/SL Tx configuration component 198 of FIG. 1.

Figure 4:
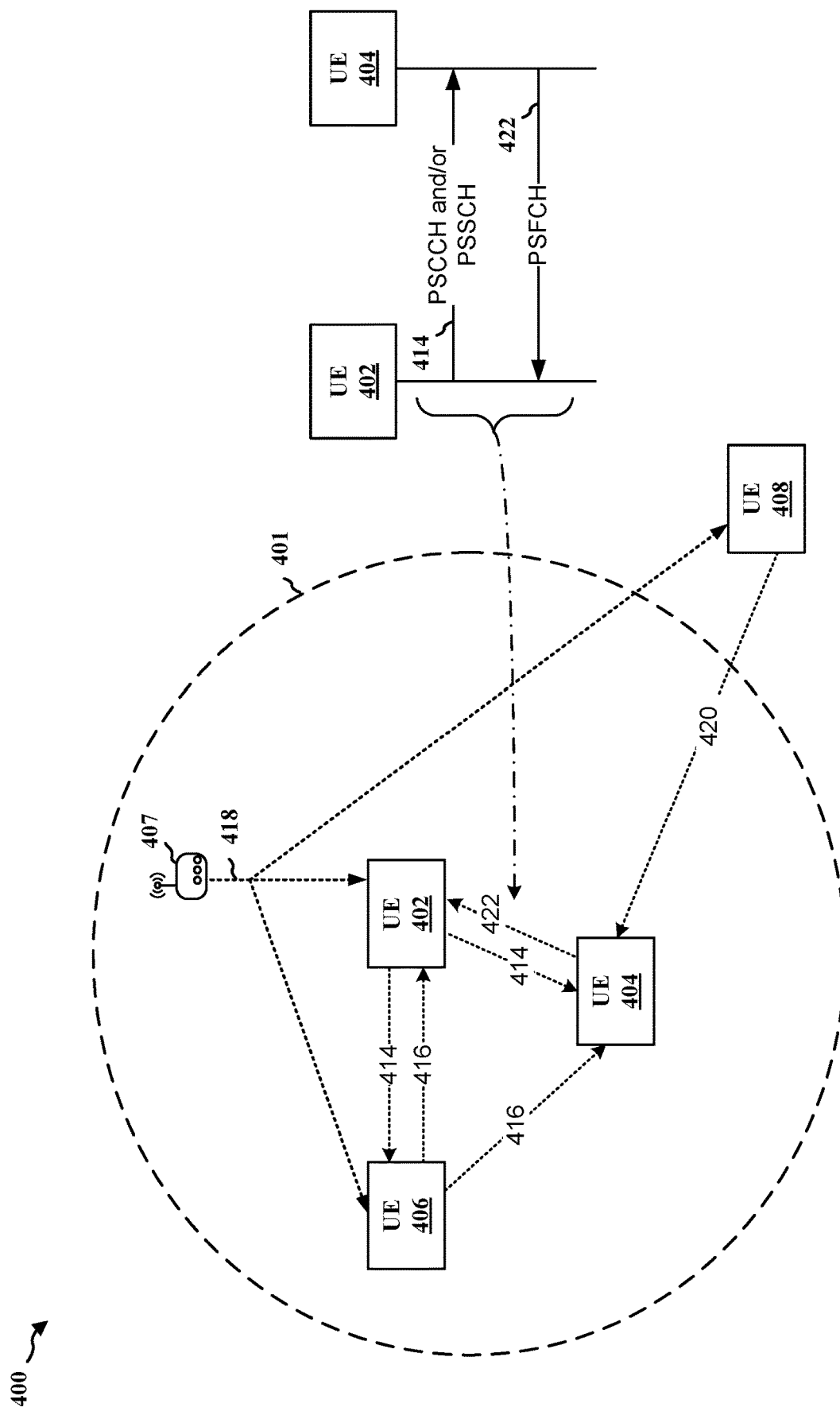
FIG. 4 is a diagram illustrating an example of wireless communication between wireless devices based on sidelink (SL) communication in accordance with various aspects of the present disclosure.

FIG. 4 is a diagram 400 illustrating an example of wireless communication between wireless devices based on sidelink (SL) communication in accordance with various aspects of the present disclosure. In one example, a UE 402 may transmit a transmission 414, e.g., including a control channel (e.g., a physical sidelink control channel (PSCCH)) and a corresponding data channel (e.g., a physical sidelink shared channel (PSSCH)), that may be received by one or more UEs (e.g., UEs 404 and 406). A control channel may include information for decoding the corresponding data channel, and it may also be used by a receiving UE for avoiding interference (e.g., UEs 404 and 406 may be refrained from transmitting data on resources occupied/reserved by the UE 402). For example, the UE 402 may indicate the number of transmission time intervals (TTIs) and the resource blocks (RBs) that are to be occupied by a transmission from the UE 402 in a control message (e.g., a sidelink control information (SCI) message). The UEs 402, 404, 406, and 408 may each have the capability to operate as a transmitting UE in addition to operating as a receiving UE. For example, UEs 404, 406, and 408 may also transmit transmissions 422, 416, and 420, respectively, to other UEs, such as the UEs 402 and 404. The transmissions 414, 416, 420 may be broadcast or multicast to nearby wireless devices or UEs. For example, the UE 402 may transmit communication (e.g., data) for receipt by other UEs within a range 401 of the UE 402. Additionally, or alternatively, a road side unit (RSU) 407 may be used to provide connectivity and information to sidelink devices, such as by receiving communication from and/or transmitting communication (e.g., communication 418) to UEs 402, 406, and 408.

Sidelink communication that is exchanged directly between UEs (which may be referred to as "sidelink UEs" hereafter) may include discovery messages for a UE to find other nearby UEs. In some examples, the sidelink communication may also include resource reservation information associated with other sidelink UEs, which may be used by a UE for determining/selecting the resources for transmission.

In one example, a sidelink communication may be based on different types or modes of resource allocation mechanisms. As shown by a diagram 500A of FIG. 5A, in a first resource allocation mode (which may be referred to as "Mode 1," "sidelink transmission Mode 1," and/or "V2X Mode 1," etc.), a centralized resource allocation may be provided. For example, under the first resource allocation mode, a base station 502 may determine and allocate sidelink resources for communications between a first UE 504 and a second UE 506. The first UE 504 may receive an indication of the allocated sidelink resources (e.g., a resource grant) from the base station 502 via a UE-to-universal mobile telecommunications system (UMTS) terrestrial radio access network (UE-to-UTRAN) (Uu) link (e.g., via a resource radio control (RRC) message or downlink control information (DCI) (e.g., DCI format 3_0)), and then the first UE 504 may use the allocated sidelink resources for communicating with the second UE 506 over the sidelink (which may also be referred to as a PC5 link).

Figure 5:
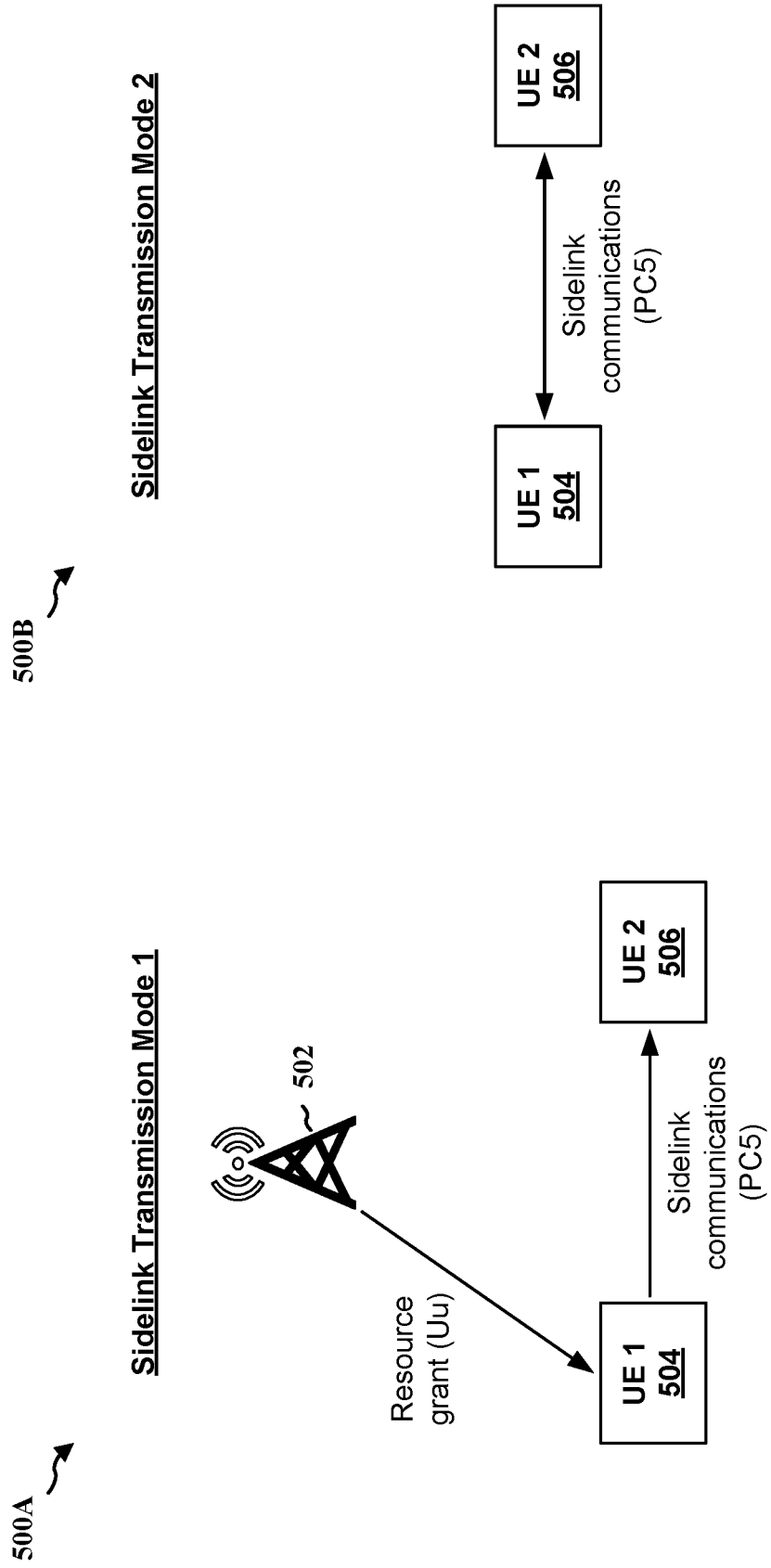
FIG. 5A is a diagram illustrating an example of a first resource allocation mode for SL communication in accordance with various aspects of the present disclosure.
FIG. 5B is a diagram illustrating an example of a second resource allocation mode for SL communication in accordance with various aspects of the present disclosure.

As shown by a diagram 500B of FIG. 5B, in a second resource allocation mode (which may be referred to as "Mode 2," "sidelink transmission Mode 2," and/or "V2X Mode 2," etc.), a distributed resource allocation may be provided between UEs. For example, under the second resource allocation mode, each UE may autonomously determine sidelink resources for its sidelink transmission. In order to coordinate the selection of sidelink resources by individual UEs, each UE may use a sensing technique to monitor/detect sidelink resources reserved/used by other UEs, and then each UE may select sidelink resources for its sidelink transmissions from unreserved/used sidelink resources. For example, a first UE 504 may sense and select unreserved/unused sidelink resources in a sidelink resource pool based on decoding SCI messages received (e.g., transmitted from a second UE 506 or another UE), and the first UE 504 may use the selected side resources for communicating with the second UE 506. After the first UE 504 selects the sidelink resources for its transmission, the first UE 504 may also transmit/broadcast (e.g., via groupcast or broadcast) to other UEs the sidelink resources used/reserved by the first UE 504 via SCI, such that other UEs may refrain using these sidelink resources to avoid resource collision (e.g., two UEs transmitting simultaneously using same time and frequency resources). Signaling on sidelink may be the same between the two resource allocation modes (e.g., Mode 1 and Mode 2). For example, from a receiving UE's point of view (e.g., the second UE 506), there may be no difference between the two resource allocation modes.

In some examples, a UE receiving a sidelink transmission (which may be referred to as a receiving UE) may be configured to provide feedback (e.g., an acknowledgement (ACK) or a negative acknowledgement (NACK)) to a UE transmitting the sidelink transmission (which may be referred to as a transmitting UE). For example, after the second UE 506 receives a transmission from the first UE 504, the second UE 506 may send an ACK to the first UE 504 via a physical sidelink feedback channel (PSFCH) if the second UE 506 is able to receive and decode the transmission. On the other hand, if the second UE 506 is unable to decode or receive the transmission, the second UE 506 may send a NACK to the first UE 504. In one example, if the transmission from the first UE 504 is a unicast or a groupcast message, the second UE 506 may be configured to transmit an explicit ACK/NACK to the first UE 504 indicating whether the transmission is successfully decoded, e.g., the second UE 506 transmits an ACK if the transmission is successfully decoded and transmits a NACK if the transmission is not successfully decoded. In another example, if the transmission from the first UE 504 is a groupcast message, the second UE 506 may be configured to transmit an implicit NACK, where the second UE 506 may transmit a NACK to the first UE 504 if the second UE 506 is unable to decode or does not receive the transmission. However, the second UE 506 may skip transmitting an ACK if the second UE 506 successfully decodes the transmission.

Sidelink communications may take place in transmission or reception sidelink resource pools. The minimum resource allocation unit in a sidelink resource pool may be a sub-channel in frequency, and the resource allocation in time may be one slot. Some slots in a sidelink resource pool may are not be available for sidelink communications (e.g., may be reserved/configured for other purposes or other types of communications). For example, some slots may contain feedback resources (e.g., a PSFCH). A base station may configure a sidelink resource pool to a set of UEs, such as via an RRC configuration, or the sidelink resource pool may be preloaded on the set of UEs (e.g., via a pre-configuration).

Figure 6:
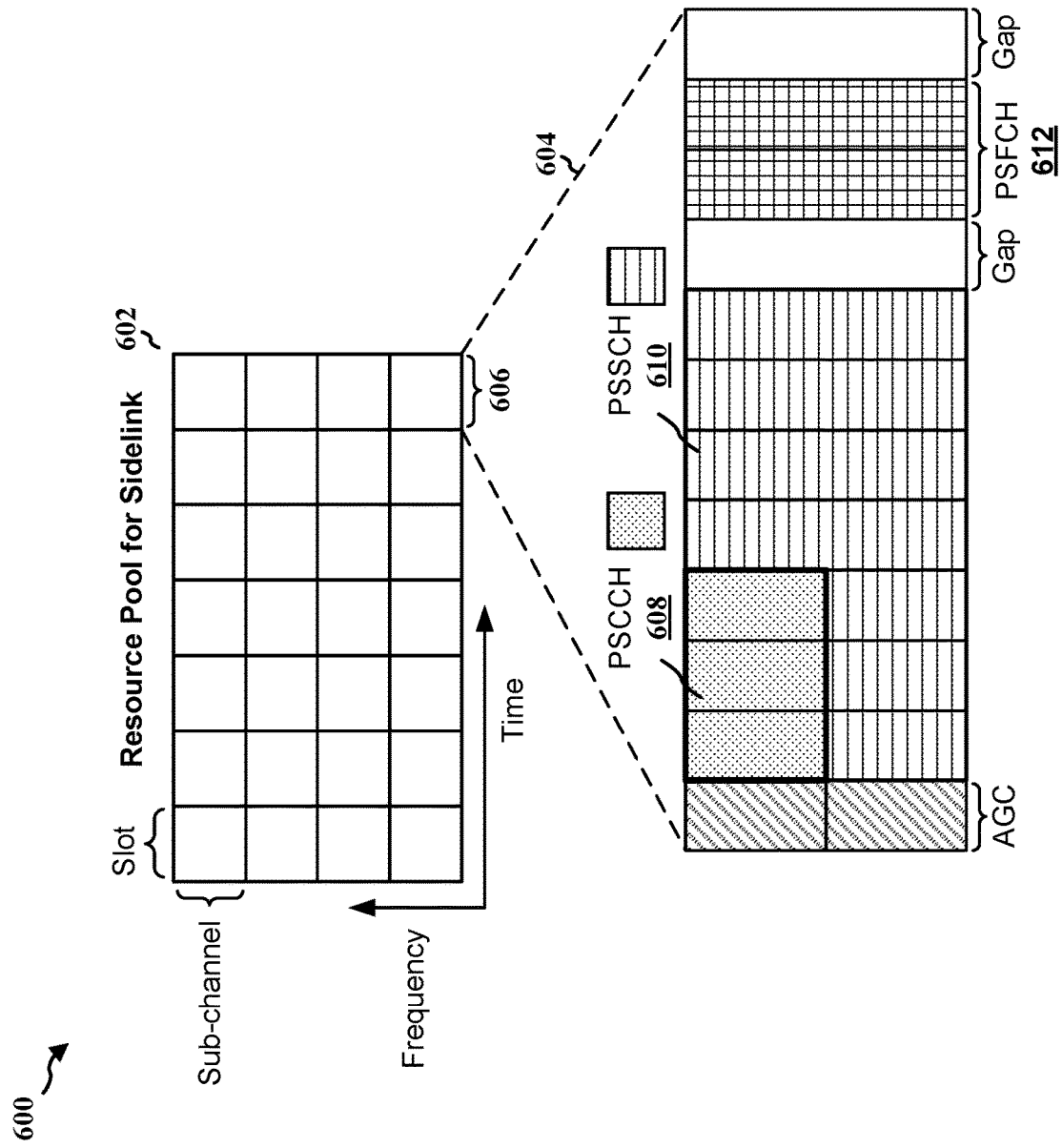
FIG. 6 is a diagram illustrating an example structure of a sidelink resource pool in accordance with various aspects of the present disclosure.

FIG. 6 is a diagram 600 illustrating an example structure of a sidelink resource pool in accordance with various aspects of the present disclosure. A sidelink resource pool 602 may include a set of time and frequency resources (e.g., each slot and sub-channel may indicate a time and frequency resource), and each time and frequency resource may be used by a transmitting UE for transmitting a PSCCH and/or a PSSCH, or used by a receiving UE for transmitting a PSFCH. For example, as shown at 604, a slot 606 may include resources for a PSCCH 608, a PSSCH 610, and a PSFCH 612. After a receiving UE receives the sidelink slot 606 (e.g., the second UE 506), the receiving UE may first decode the SCI in the PSCCH 608 and/or the PSSCH 610 (e.g., for a two-stage SCI), then decode data in the PSSCH 610. The receiving UE may also receive a feedback via the PSFCH 612 (e.g., for a previous transmission to the transmitting UE), or the receiving UE may also transmit a feedback for the PSSCH 610 via the PSFCH 612.

Figure 7:
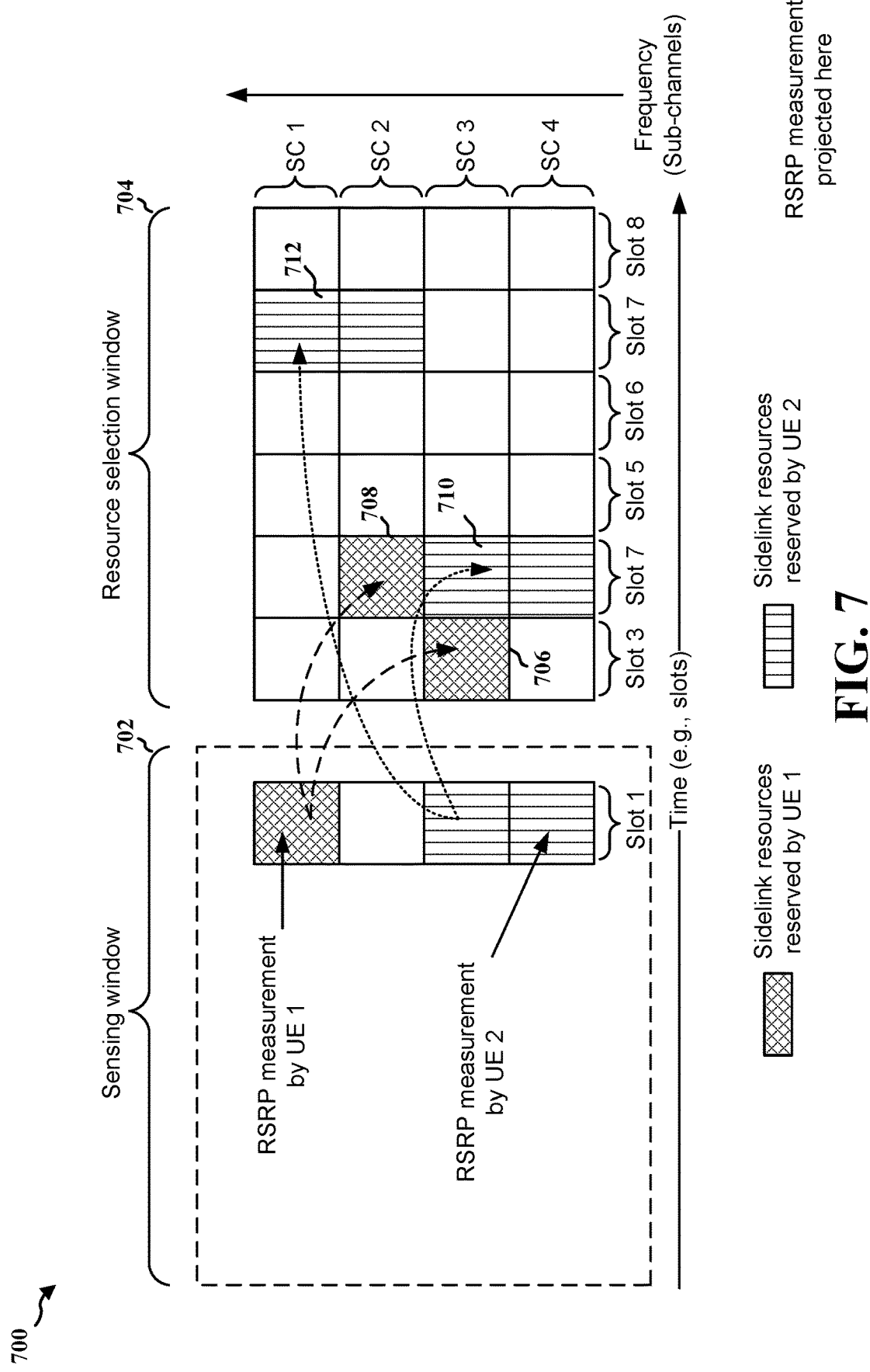
FIG. 7 is a diagram illustrating an example of sidelink resource reservations in accordance with various aspects of the present disclosure.

FIG. 7 is a diagram 700 illustrating an example of sidelink resource reservations in accordance with various aspects of the present disclosure. A transmitting UE (e.g., the first UE 504) may determine whether a sidelink resource is available by decoding SCI(s) it receives from other UEs, and the transmitting UE may measure reference signal received power (RSRP) for reservations in decoded SCI(s). The RSRP of the transmission associated with SCI reserving resources may be projected onto a resource selection window. The transmitting UE may measure the RSRP on PSCCH or PSSCH DMRS according to a (pre-)configuration. The length of the sensing window (e.g., where SCI is decoded) may also be (pre-)configured. In addition, each reservation may include a priority indicated in SCI that is also tracked as part of sensing.

Sidelink resource(s) reserved for a transmitting UE (e.g., the first UE 504) may include one or more sub-channels (SCs) in the frequency domain (e.g., SC1 to SC 4) and a slot in the time domain. For example, as shown at 702, a first transmitting UE and a second transmitting UE may use resources in a current slot (e.g., slot 1) for transmission, and/or for sensing and reserving resources in future slots (e.g., for transmission/retransmissions). In some examples, as shown at 704, a UE may reserve up to two future resources and the resource reservation may be limited to a resource selection window with defined slots and sub-channels. For example, the first transmitting UE (e.g., UE 1) may reserve two future sidelink resources 706 and 708 in the resource selection window, and the second transmitting UE (e.g., UE 2) may reserve two future sidelink resources 710 and 712 in the resource selection window, etc. After selecting and/or reserving the sidelink resources for transmission/retransmission, the first transmitting UE and the second transmitting UE may transmit its resource reservation information to other UEs via SCI.

A sidelink resource reservation may be periodic or aperiodic. If the resource reservation is configured to be periodic, the periodic resource reservation may be turned on or off by a configuration in a sidelink resource pool. Also, a UE may be configured to continue monitoring resource reservation messages (e.g., SCIs) sent by other UE(s) or stations so that the UE may maintain a sensing history regarding which resources are being used and/or reserved. Then, the UE may perform resource selection based at least in part on the sensing history when the UE has a transmission. The UE may maintain reservation information for a period of time, e.g., within a sensing window (e.g., as shown at 702). The length of the sensing window may be configured for the UE, such as by a base station. Each resource reservation may have a priority level indicated in the SCI, such that a transmission with a higher priority reservation may pre-empt a transmission with a lower priority reservation.

As described above, a transmitting UE may perform signal/channel measurement for a sidelink resource that has been reserved and/or used by other UE(s), such as by measuring the RSRP of the SCI that reserves the sidelink resource. Based at least in part on the signal/channel measurement, the transmitting UE may consider using/reusing the sidelink resource that has been reserved by other UE(s). For example, a UE may consider a reserved resource to be available when the RSRP measured for the SCI reserving the resource is below an RSRP threshold, and the UE may use/reuse that reserved resource for transmission. When the measured RSRP is below the RSRP threshold, it may indicate that the UE reserving the resource may be distant or not using the reserved resource. As such, the use/reuse of the reserved resource may be less likely to cause interference or impact to that UE. In some examples, the RSRP threshold may be determined or changed based on the amount of available resources in a resource selection window. For example, if the amount of available resources is below a threshold/percentage (e.g., below 20%) within a resource selection window, the UE may be configured to use an increased/higher RSRP threshold so that the UE is more likely to be able to reuse resources reserved by other UEs. The RSRP comparison threshold may be (pre-)configured per transmitter priority and receiver priority pair. In addition, a sidelink (or packet) transmission or retransmission may be configured with a packet delay budget (PDB), which may provide a time in which the sidelink transmission or retransmission is to be transmitted by a UE. If the UE is unable to transmit the sidelink transmission within the PDB, the UE may be configured to abort or discard the transmission, and restart the sidelink resource sensing and selection process.

Figure 8:
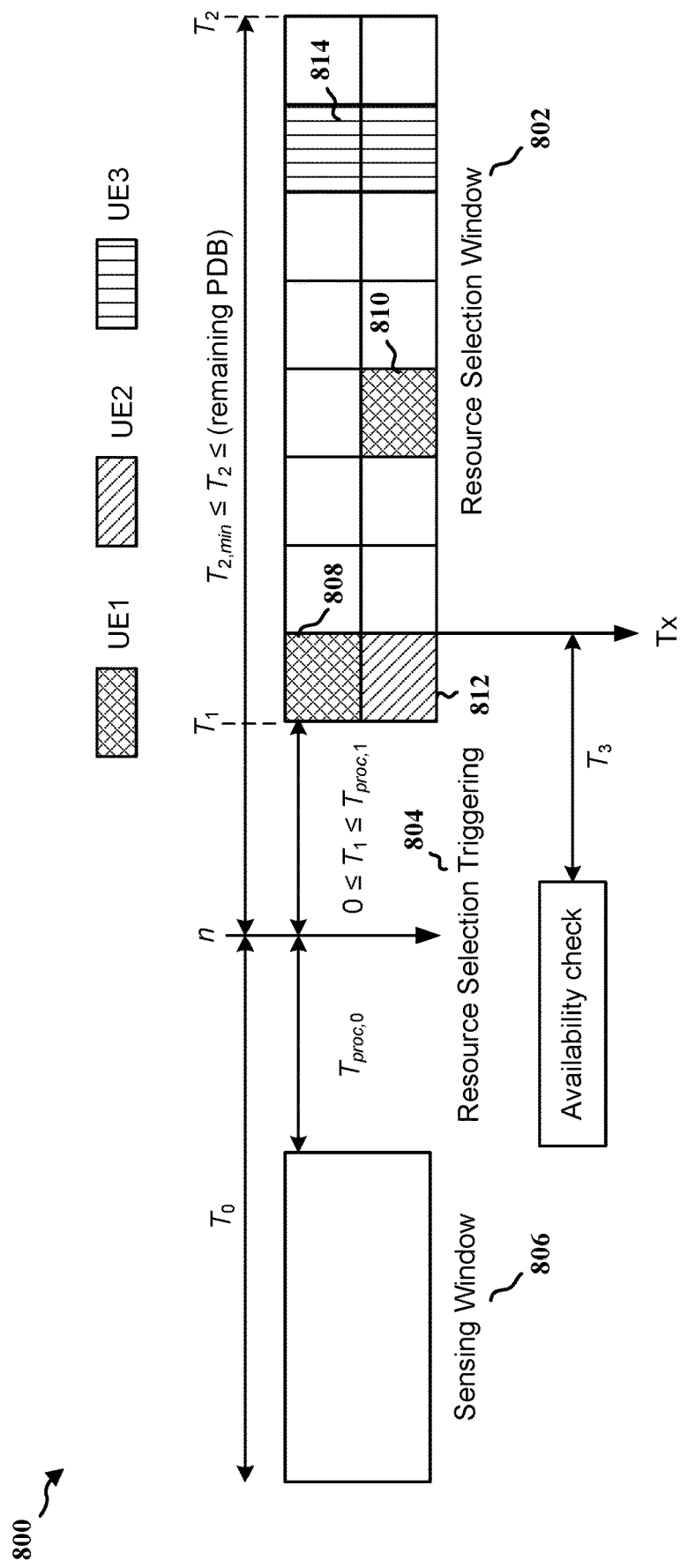
FIG. 8 is a diagram illustrating an example resource selection timeline in accordance with various aspects of the present disclosure.

FIG. 8 is a diagram 800 illustrating an example resource selection timeline in accordance with various aspects of the present disclosure. A UE may select sidelink resources from a resource selection window 802, which is illustrated as having sixteen (16) resource blocks formed by two sub-channels and eight slots in this example. The duration of the resource selection window 802 may be represented by [n+$T_1$, n+$T_2$], where n may represent the time a resource selection is triggered, such as shown at 804 when the UE is selecting a sidelink resource for transmission. $T_1$ may represent the starting of the resource selection window 802 and $T_2$ may represent the end of the resource selection window 802. The length of the resource selection window 802 may vary depending on the configuration, and may be configured for the UE via an upper layer (e.g., from 20 ms to 100 ms etc.). In some examples, the value of $T_0$ may be (pre-)configured to be 100 ms or 1100 ms. The value of $T_1$ may be up to the UE implementation (e.g., selected from a time between zero (0) and the time it takes the UE to process and implement the resource selection (e.g., $T_{proc,1}$)), and the value of $T_2$ may be selected from a time between $T_{2,min}$ and the remaining of a PDB duration associated with the transmission. In some examples, $T_{2,min}$ may be configured per each sidelink priority value which may be indicated in SCI from the following set of values: $\{1, 5, 10, 20\} \cdot 2^{\mu-1}$ slots, where $\mu=1, 2, 3, 4$ for 15, 30, 60, 120 kHz sub-carrier spacing (SCS), respectively. PDB may be used to define the upper limit of a delay suffered by a packet between the UE and policy and charging enforcement function (PCEF). A UE may be specified to confirm resource availability at least time $T_3$ before transmission.

For example, as a UE may sense and decode sidelink messages (e.g., SCIs) from other UE(s), a sensing history (or resource use/reservation history) may be recorded/determined from a sensing window 806 and used by the UE to determine which resources in the resource selection window 802 are reserved by other UE(s). For example, the sensing window 806 may represent a time duration prior to the resource selection during which the UE may collect resource reservation related information from other UEs (e.g., via their SCIs). In one example, the time duration may be the last 1,000 ms prior to the resource selection triggering at 804. In other examples, the sensing window 806 may have a duration between 100 ms to 1,100 ms, as represented by $T_0$ in FIG. 8, minus the time it takes the UE to process the sensing window 806 (e.g., $T_{proc,0}$).

Based on the resource reservation related information obtained during the sensing window 806, the UE may determine available candidate resources for the resource selection window 802. For example, based on the resource reservation information decoded from SCIs of other UEs (e.g., UE 1, UE 2, and UE 3), the UE may discover that UE1 has transmitted a data during the sensing window 806 and has reserved resource blocks 808 and 810 in the resource selection window 802. Similarly, based on the sensing window 806, the UE may also discover that resource blocks 812 and 814 have been reserved by UE2 and UE3, respectively. As such, the UE may determine that resource blocks 808, 810, 812 and 814 in the resource selection window 802 are not available for selection and may excluded these resource blocks from selection. Then, the UE may identify the remaining resource blocks as available candidate resources. The UE may perform the sensing up to a defined duration (e.g., $T_3$) before its transmission.

FIG. 9 is a diagram 900 illustrating an example configured grant (CG) configuration in accordance with various aspects of the present disclosure. In some scenarios, a network entity (e.g., a base station) may schedule a set of uplink (UL) transmissions for a UE using a CG (which may be referred to as an UL-CG), such that the base station may avoid requesting and assigning resources for each UL transmission from the UE by pre-allocating resources to the UE. For example, a base station may configure a UE with an UL-CG via an UL-CG configuration, where the UL-CG configuration may include a set of parameters (e.g., resource allocation, periodicities of resources, frequency hopping type, MCS used, etc., as shown by FIG. 9) that configures the UE with a set of UL transmissions, such that the UE may transmit UL transmissions using specified time and frequency resources at a defined periodicity. As such, an UL-CG may be defined by time and frequency resources and similarly periodicity, repetition, and other configurations. In one example, an UL-CG may have two types, where one type may not specify a DCI activation whereas the other type may specify a DCI activation (e.g., the CG is activated for the UE via a DCI message). In some examples, if a UE does not have anything to transmit in an UL transmission occasion (e.g., an UL transmission in the set of UL transmissions configured by the UL-CG), the UE may skip transmission in that UL transmission occasion (which may be referred to as "UL-CG skipping"). In other words, UL-CG skipping is a feature that enables a UE to skip the transmission of CG in case the UL buffer is empty. For purposes of the present disclosure, if a wireless device, such as a UE, skips a transmission, the wireless device may be configured not to transmit anything for that transmission or transmit zero data for that transmission.

While a UE may use the UL-CG skipping feature to skip one or more UL transmissions configured based on the CG (which may be referred to as "UL-CG instance(s)" or "UL transmission instance(s)"), resources associated with the skipped UL transmission(s) may be wasted. As resources associated with a CG may be reserved for a specified UE, other UE(s) may not be able to use it because they may not know whether the UE is going to skip any of the UL transmissions.

Aspects presented herein may improve resource utilization for a communication network. Aspects presented herein may enable a UE with an UL-CG to use resources associated with one or more UL transmissions for sidelink communications. For example, if a UE with an UL-CG determines to skip an UL transmission associated with the UL-CG (e.g., when the UL buffer is empty for the UE), the UE may use the resource associated with the skipped UL transmission for communicating with another UE over the sidelink (e.g., for transmitting a sidelink message to that UE or for receiving a sidelink massage from that UE, etc.). In addition, if other UEs in the sidelink are aware of the UE's UL-CG, they may be configured to monitor the resources associated with the UL-CG for sidelink transmission from the UE, which may reduce power consumption at these UEs. In some examples, the UL-CG and the sidelink resources may be within the same carrier.

Figure 10:
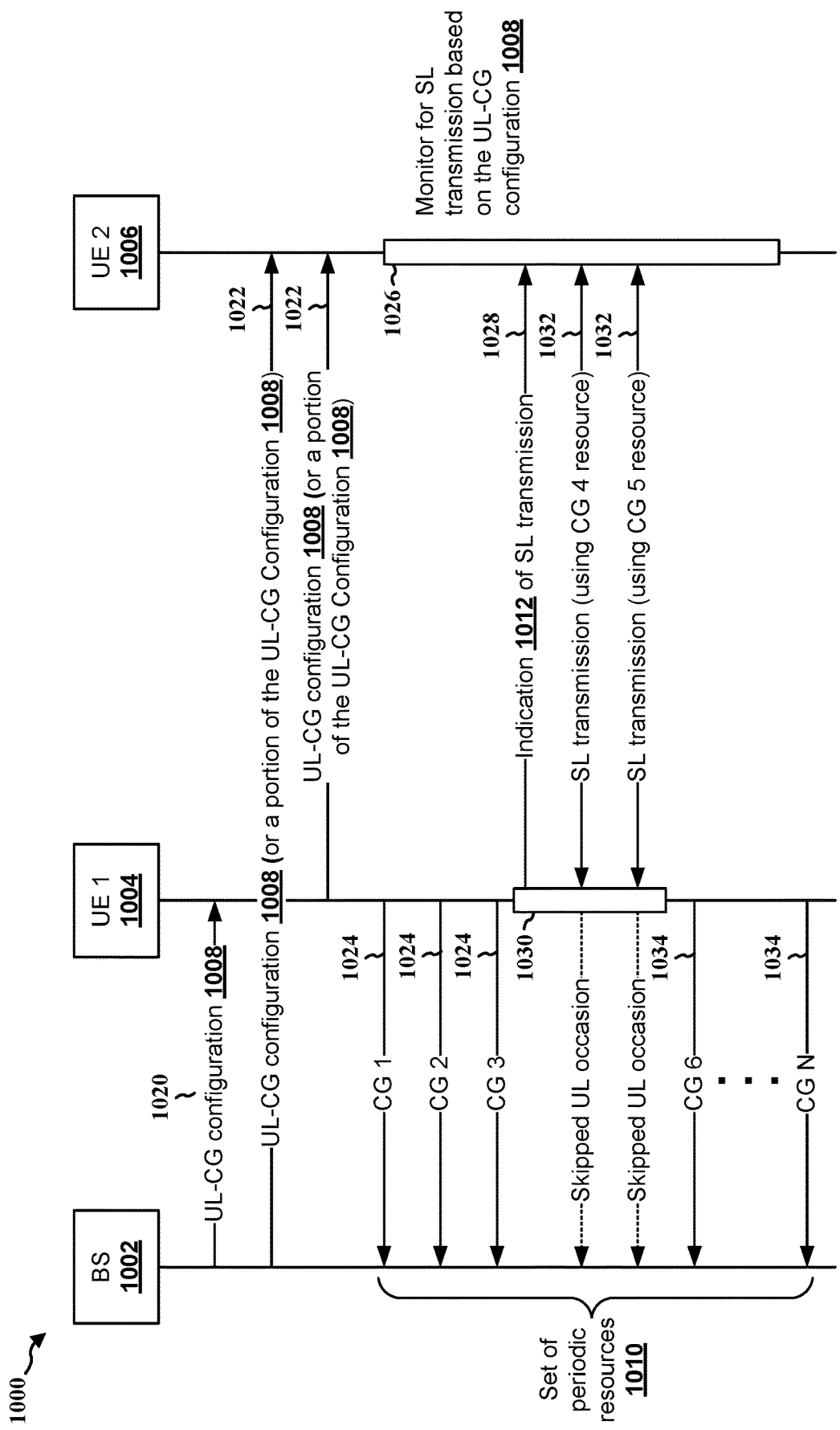
FIG. 10 is a communication flow illustrating an example of a UE using a skipped UL transmission for sidelink communication in accordance with various aspects of the present disclosure.

FIG. 10 is a communication flow 1000 illustrating an example of a UE using a skipped UL transmission for sidelink communication in accordance with various aspects of the present disclosure. The numberings associated with the communication flow 1000 do not specify a particular temporal order and are merely used as references for the communication flow 1000. Aspects presented herein may enable a network entity (e.g., a base station) and/or a transmitting UE (e.g., a UE with an UL-CG) to share the transmitting UE's UL-CG configurations with a subset of sidelink UEs (e.g., receiving UEs), where the network entity may share this configuration over a Uu link and the UE may share this configuration over sidelink. The shared UL-CG configurations may not include the entire set of parameters of the UL-CG configurations but a subset of the parameters, such as just the time and frequency resources as well as the periodicity for the UL transmissions. In response, a receiving UE may be configured to perform reception in all UL-CG occasions of the transmitting UE, perform reception in an RRC configured subset of UL-CG occasions of the transmitting UE, or perform reception when it receives an indication from the transmitting UE. In some examples, the transmitting UE may be configured with an allowance to drop the UL transmission to use it for sidelink. The transmitting UE may also skip/free-up multiple UL-CG occasions and use it for sidelink depending on the priority order between the UL and sidelink.

At 1020, a base station 1002 (or a network node) may transmit an UL-CG configuration 1008 to a first UE 1004, where the UL-CG configuration 1008 may include a set of periodic resources 1010 in which the first UE 1004 may use for transmitting UL transmissions to the base station 1002, such as described in connection with FIG. 9. For example, the set of periodic resources 1010 may include a first CG resource (CG 1), a second CG resource (CG 2), a third CG resource (CG 3), and up to $N^{th}$ CG resource (CG N). UL transmission based on each CG resource may be referred to as an UL-CG occasion. For purposes of the present disclosure, a periodic resource may refer to a time and frequency resource that is available at a specified interval (e.g., every X slots, every Y ms, etc.) for transmission and/or reception. For example, a periodic resource may be a time and frequency resource (e.g., symbol(s) and a bandwidth) that is available to a UE at every two slots, where the UE may use each periodic resource for transmitting UL data to a base station.

At 1022, the base station 1002 and/or the first UE 1004 may transmit the UL-CG configuration 1008 or a portion of the UL-CG configuration 1008 to at least a second UE 1006 (or a subset of sidelink UEs). For example, the base station 1002 may transmit the UL-CG configuration 1008 or a portion of the UL-CG configuration 1008 to the second UE 1006 over a Uu link, and the first UE 1004 may transmit the UL-CG configuration 1008 or a portion of the UL-CG configuration 1008 to the second UE 1006 via a sidelink.

Based on the UL-CG configuration 1008, the second UE 1006 may know the set of periodic resources 1010 (e.g., CG 1 to CG N) that is configured for the first UE 1004. In one example, as the second UE 1006 may be just specified (or interested) to know the set of periodic resources 1010 configured for the first UE 1004, the base station 1002 and/or the first UE 1004 may transmit a portion of the UL-CG configuration 1008 to the second UE 1006 instead of the entire set of the UL-CG configuration 1008 (e.g., as shown by FIG. 9) to reduce signaling overhead. For example, the base station 1002 and/or the first UE 1004 may just indicate the time, the frequency, and the periodicity (e.g., between two periodic resources) associated with the set of periodic resources 1010 to the second UE 1006.

At 1024, the first UE 1004 may transmit UL transmissions to the base station 1002 based on the UL-CG configuration 1008, such as using the set of periodic resources 1010 for transmitting data to the base station 1002.

At 1026, in response to the UL-CG configuration 1008 or the portion of the UL-CG configuration 1008 received from the base station 1002 and/or the first UE 1004, the second UE 1006 may monitor for one or more SL transmissions from the first UE 1004 (e.g., based on the set of periodic resources 1010).

In one example, the second UE 1006 may be configured to monitor sidelink transmissions from the first UE 1004 based on all UL-CG occasions (e.g., CG 1 to CG N) associated with the set of periodic resources 1010. In another example, to reduce power consumption at the second UE 1006, the second UE 1006 may be configured to monitor sidelink transmissions from the first UE 1004 based on a subset of UL-CG occasions associated with the set of periodic resources 1010. For example, the second UE 1006 may be configured to monitor sidelink transmissions on odd UL-CG occasions (e.g., on CG 1, CG 3, CG 5, etc.), on even UL-CG occasions (e.g., on CG 2, CG 4, CG 6, etc.), or on every X UL-CG occasion (e.g., on CG 3, CG 6, CG 9, etc. for X=3). The base station 1002 may configure the second UE 1006 to monitor the subset of UL-CG occasions via an RRC configuration. In another example, to further reduce power consumption at the second UE 1006, the second UE 1006 may be configured to monitor for sidelink transmissions from the first UE 1004 after the second UE receives an indication from the first UE 1004, such as shown at 1028 (described in more details below).

At 1030, the first UE 1004 may determine to skip the at least one UL transmission associated with the UL-CG configuration 1008. For example, the first UE 1004 may not have anything to transmit for two subsequent UL-CG occasions (e.g., CG 4 and CG 5). If the first UE 1004 is communicating with the second UE 1006 over sidelink, the first UE 1004 may use at least a portion of resources for these two subsequent UL-CG occasions for the sidelink communication.

For example, at 1032, after determining to skip two subsequent UL-CG occasions (e.g., CG 4 and CG 5), the first UE 1004 may transmit sidelink transmission(s) to the second UE 1006 using resources (or a portion of the resources) configured for these two subsequent UL-CG occasions (e.g., resources for CG 4 and CG 5). In another example, the first UE 1004 may also receive sidelink transmission(s) from the second UE 1006 via these resources if the second UE 1006 is aware that the first UE 1004 is skipping these two UL-CG occasions (e.g., based on an indication from the first UE 1004).

In some examples, as described above, the second UE 1006 may be configured to monitor for sidelink transmissions from the first UE 1004 based on the indication from the first UE 1004. As such, at 1028, if the first UE 1004 determines to use the skipped UL-CG resources for communicating with the second UE 1006, the first UE 1004 may transmit an indication 1012 to inform the second UE 1006 regarding the sidelink transmission.

In another example, the first UE 1004 may skip one or more UL transmission based on the base station 1002's permission. For example, the base station 1002 may transmit a configuration for an allowance to skip at least one UL transmission (or to skip up to X UL transmissions) to the first UE 1004, and the first UE 1004 may skip at least one UL transmission (or to skip up to X UL transmissions) based on the configuration.

In another example, the first UE 1004 may determine to skip one or more UL transmissions based on a priority order between an UL transmission and a sidelink transmission. For example, if a sidelink transmission is associated with a higher priority compared to an UL transmission, the first UE 1004 may skip/drop the UL transmission and use the skipped/dropped resources for the SL transmission. Under such example, the first UE 1004 may skip/drop the UL transmission even if there are data (e.g., Uu data) scheduled to be transmitted using the UL transmission. In addition, the first UE 1004 may also skip more than one UL transmission if the sidelink transmission (with higher priority) specifies additional transmission resources.

In another example, the first UE 1004 may determine whether to skip an UL transmission (or whether it is permitted to skip an UL transmission) based on the slot type configured for the UL transmission. For example, a slot configured for the first UE 1004 may include an UL slot, a flexible (FL) slot, a full-duplex (FD) slot, and/or a half-duplex (HD) slot. Thus, the first UE 1004 may be permitted to skip an UL transmission is the UL transmission is configured with an UL slot, and the first UE 1004 may not be permitted to skip an UL transmission is the UL transmission is configured with an FD slot, etc. A half-duplex transmission may refer to a one-way transmission between two UEs (e.g., a transmitting UE and a receiving UE), whereas a full-duplex may refer to a two-way transmission between two UEs at the same time.

In another example, prior to 1032, the first UE 1004 may receive a configuration (e.g., from the base station 1002) that configures one or more parameters for transmitting the SL transmission, where the one or more parameters may be based on at least one configuration parameter of the UL-CG configuration 1008. For example, as the base station 1002 knows the parameters associated with the UL-CG configuration 1008 (e.g., the time and frequency resource, the beam direction, the periodicity, the bandwidth, the SCS, etc.) for the first UE 1004, the base station 1002 may determine the beam direction, the modulation coding scheme (MCS), the bandwidth, and/or the transmission (Tx) power for the first UE 1004 to transmit the SL transmission(s) based on some of these parameters. Similarly, the second UE 1006 may also receive a configuration (e.g., from the base station 1002) that configures one or more parameters for receiving the SL transmission, where the one or more parameters may be based on at least one configuration parameter of the UL-CG configuration 1008. For example, as the base station 1002 knows the parameters associated with the UL-CG configuration 1008 for the first UE 1004, the base station 1002 may determine the beam direction, the MCS, the bandwidth, and/or the reception (Rx) power for the second UE 1006 to receive the SL transmission(s) based on some of these parameters.

At 1034, after the sidelink transmission is performed (e.g., by either the first UE 1004 or the second UE 1006), if the first UE 1004 has data to be transmitted to the base station 1002, the first UE 1004 may resume UL transmissions based on the UL-CG configuration 1008.

Figure 11:
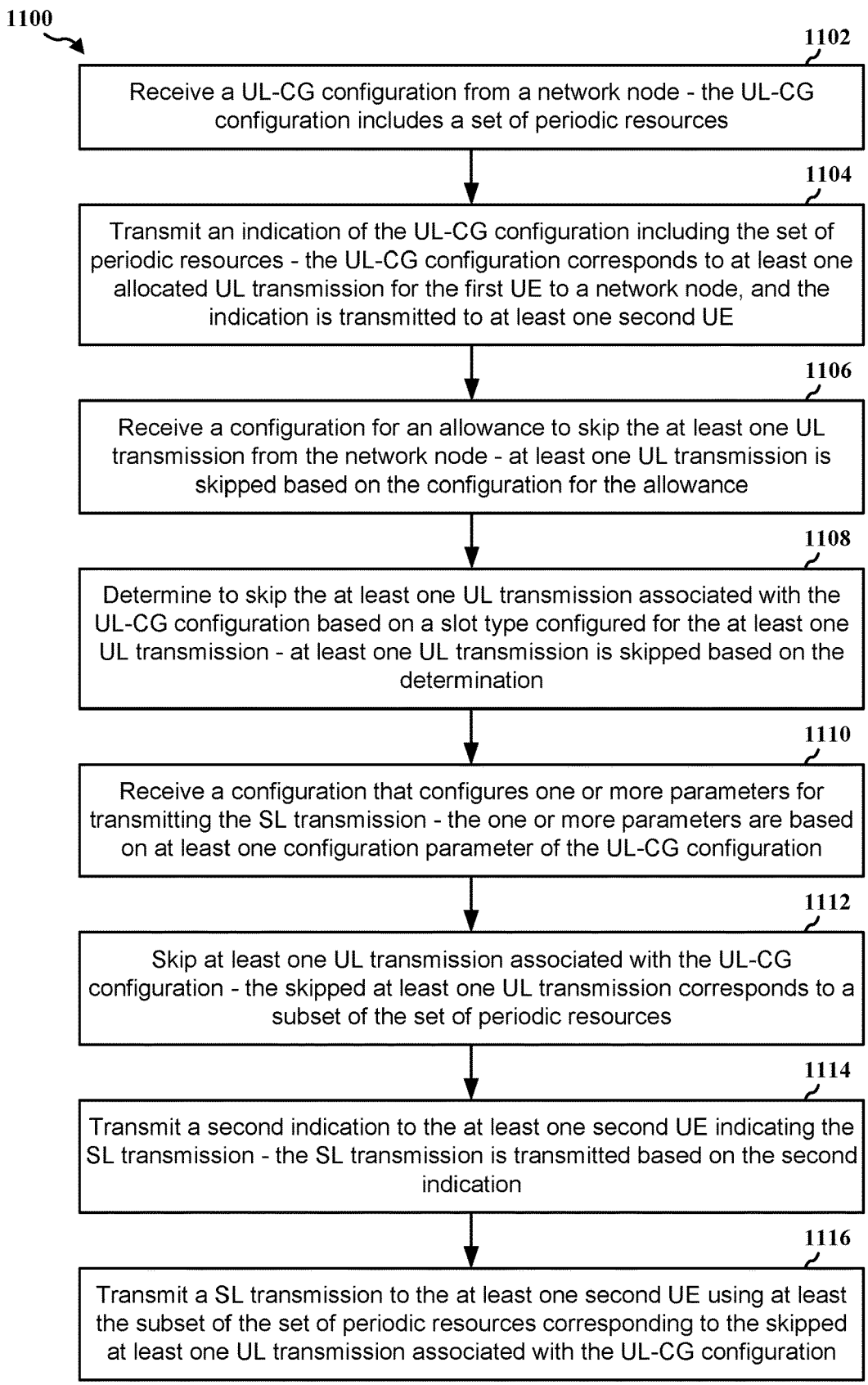
FIG. 11 is a flowchart of a method of wireless communication.

FIG. 11 is a flowchart 1100 of a method of wireless communication. The method may be performed by a UE (e.g., the UE 104, 402, 404, 406, 504, 506, 1004; the apparatus 1304). The method may enable the UE with an UL-CG to use resources associated with one or more UL transmissions for sidelink communications.

At 1102, the UE may receive a UL-CG configuration from a network node, where the UL-CG configuration includes a set of periodic resources, such as described in connection with FIG. 10. For example, at 1020, the first UE 1004 may receive an UL-CG configuration 1008 from the base station 1002, where the UL-CG configuration 1008 includes a set of periodic resources 1010. The reception of the UL-CG configuration may be performed by, e.g., the UL-CG/SL Tx configuration component 198, the cellular baseband processor 1324, and/or the transceiver(s) 1322 of the apparatus 1304 in FIG. 13.

At 1104, the UE may transmit an indication of the UL-CG configuration including the set of periodic resources, where the UL-CG configuration corresponds to at least one allocated UL transmission for the first UE to a network node, and the indication is transmitted to at least one second UE, such as described in connection with FIG. 10. For example, at 1022, the first UE 1004 may transmit the UL-CG configuration 1008 or a portion of the UL-CG configuration 1008 to the second UE 1006, where the UL-CG configuration 1008 includes the set of periodic resources 1010. The transmission of the indication of the UL-CG configuration may be performed by, e.g., the UL-CG/SL Tx configuration component 198, the cellular baseband processor 1324, and/or the transceiver(s) 1322 of the apparatus 1304 in FIG. 13.

In one example, transmitting the indication of the UL-CG configuration may include forwarding the UL-CG configuration received from the network node.

In another example, the indication includes a subset of parameters of the UL-CG configuration received from the network node.

In another example, the set of periodic resources is associated with a set of time and frequency resources and a periodicity for the at least one allocated UL transmission.

In another example, the UE corresponds to a transmitting SL UE and the at least one second UE corresponds to a receiving SL UE.

At 1106, the UE may receive a configuration for an allowance to skip the at least one UL transmission from the network node, where at least one UL transmission is skipped based on the configuration for the allowance, such as described in connection with FIG. 10. For example, the first UE 1004 may receive a configuration for an allowance to skip the at least one UL transmission from the base station 1002, where at least one UL transmission is skipped based on the configuration for the allowance. The reception of the configuration for an allowance to skip the at least one UL transmission may be performed by, e.g., the UL-CG/SL Tx configuration component 198, the cellular baseband processor 1324, and/or the transceiver(s) 1322 of the apparatus 1304 in FIG. 13.

At 1108, the UE may determine to skip the at least one UL transmission associated with the UL-CG configuration based on a slot type configured for the at least one UL transmission, where at least one UL transmission is skipped based on the determination, such as described in connection with FIG. 10. For example, at 1030, the first UE 1004 may determine to skip the at least one UL transmission associated with the UL-CG configuration 1008 based on a slot type configured for the at least one UL transmission, where at least one UL transmission is skipped based on the determination. The determination to skip the at least one UL transmission may be performed by, e.g., the UL-CG/SL Tx configuration component 198, the cellular baseband processor 1324, and/or the transceiver(s) 1322 of the apparatus 1304 in FIG. 13. In one example, the slot type includes at least one of: an UL slot, a flexible slot, a full-duplex slot, or a half-duplex slot.

At 1110, the UE may receive a configuration that configures one or more parameters for transmitting the SL transmission, where the one or more parameters are based on at least one configuration parameter of the UL-CG configuration, such as described in connection with FIG. 10. For example, the first UE 1004 may receive a configuration from the base station 1002 that configures one or more parameters for transmitting the SL transmission, where the one or more parameters are based on at least one configuration parameter of the UL-CG configuration 1008. The reception of the configuration that configures one or more parameters for transmitting the SL transmission may be performed by, e.g., the UL-CG/SL Tx configuration component 198, the cellular baseband processor 1324, and/or the transceiver(s) 1322 of the apparatus 1304 in FIG. 13. In one example, the one or more parameters include at least one of: a beam direction, a MCS, a bandwidth, or a Tx power for transmitting the SL transmission.

At 1112, the UE may skip at least one UL transmission associated with the UL-CG configuration, where the skipped at least one UL transmission corresponds to a subset of the set of periodic resources, such as described in connection with FIG. 10. For example, at 1030 and 1032, the first UE 1004 may skip at least one UL transmission associated with the UL-CG configuration 1008, where the skipped at least one UL transmission corresponds to a subset of the set of periodic resources 1010. The skipping of at least one UL transmission may be performed by, e.g., the UL-CG/SL Tx configuration component 198, the cellular baseband processor 1324, and/or the transceiver(s) 1322 of the apparatus 1304 in FIG. 13.

In one example, the at least one UL transmission is skipped based on a priority order between UL communication and SL communication. In such an example, a plurality of UL transmissions is skipped based on the SL transmission having a higher priority order than the plurality of UL transmissions.

At 1114, the UE may transmit a second indication to the at least one second UE indicating the SL transmission, where the SL transmission is transmitted based on the second indication, such as described in connection with FIG. 10. For example, at 1028, the first UE 1004 may transmit an indication 1012 to the second UE 1006 indicating the SL transmission, where the SL transmission is transmitted to the second UE 1006 based on the indication 1012. The transmission of the second indication may be performed by, e.g., the UL-CG/SL Tx configuration component 198, the cellular baseband processor 1324, and/or the transceiver(s) 1322 of the apparatus 1304 in FIG. 13.

At 1116, the UE may transmit a SL transmission to the at least one second UE using at least the subset of the set of periodic resources corresponding to the skipped at least one UL transmission associated with the UL-CG configuration, such as described in connection with FIG. 10. For example, at 1032, the first UE 1004 may transmit a SL transmission to the second UE 1006 using at least the subset of the set of periodic resources 1010 corresponding to the skipped at least one UL transmission associated with the UL-CG configuration 1008. The transmission of the SL transmission may be performed by, e.g., the UL-CG/SL Tx configuration component 198, the cellular baseband processor 1324, and/or the transceiver(s) 1322 of the apparatus 1304 in FIG. 13.

Figure 12:
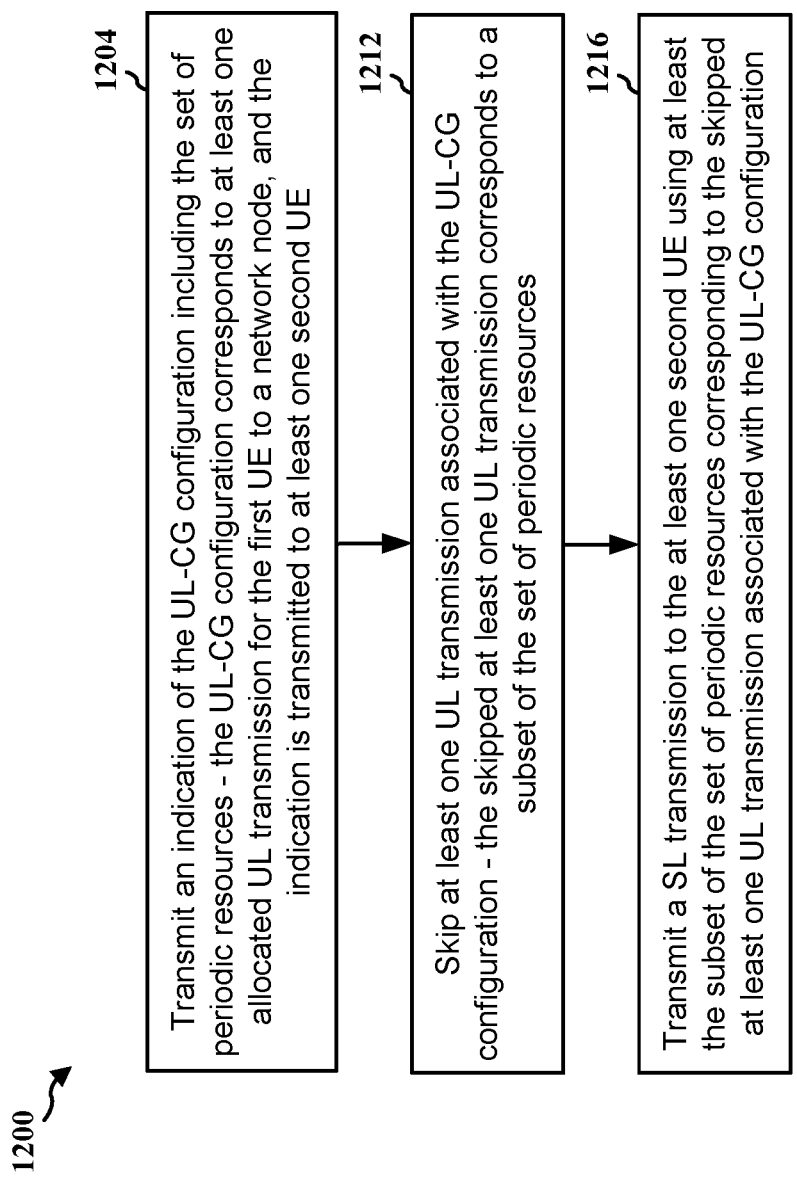
FIG. 12 is a flowchart of a method of wireless communication.

FIG. 12 is a flowchart 1200 of a method of wireless communication. The method may be performed by a UE (e.g., the UE 104, 402, 404, 406, 504, 506, 1004; the apparatus 1304). The method may enable the UE with an UL-CG to use resources associated with one or more UL transmissions for sidelink communications.

At 1204, the UE may transmit an indication of an UL-CG configuration including a set of periodic resources, where the UL-CG configuration corresponds to at least one allocated UL transmission for the first UE to a network node, and the indication is transmitted to at least one second UE, such as described in connection with FIG. 10. For example, at 1022, the first UE 1004 may transmit the UL-CG configuration 1008 or a portion of the UL-CG configuration 1008 to the second UE 1006, where the UL-CG configuration 1008 includes the set of periodic resources 1010. The transmission of the indication of the UL-CG configuration may be performed by, e.g., the UL-CG/SL Tx configuration component 198, the cellular baseband processor 1324, and/or the transceiver(s) 1322 of the apparatus 1304 in FIG. 13.

At 1212, the UE may skip at least one UL transmission associated with the UL-CG configuration, where the skipped at least one UL transmission corresponds to a subset of the set of periodic resources, such as described in connection with FIG. 10. For example, at 1030 and 1032, the first UE 1004 may skip at least one UL transmission associated with the UL-CG configuration 1008, where the skipped at least one UL transmission corresponds to a subset of the set of periodic resources 1010. The skipping of at least one UL transmission may be performed by, e.g., the UL-CG/SL Tx configuration component 198, the cellular baseband processor 1324, and/or the transceiver(s) 1322 of the apparatus 1304 in FIG. 13.

At 1216, the UE may transmit a SL transmission to the at least one second UE using at least the subset of the set of periodic resources corresponding to the skipped at least one UL transmission associated with the UL-CG configuration, such as described in connection with FIG. 10. For example, at 1032, the first UE 1004 may transmit a SL transmission to the second UE 1006 using at least the subset of the set of periodic resources 1010 corresponding to the skipped at least one UL transmission associated with the UL-CG configuration 1008. The transmission of the SL transmission may be performed by, e.g., the UL-CG/SL Tx configuration component 198, the cellular baseband processor 1324, and/or the transceiver(s) 1322 of the apparatus 1304 in FIG. 13.

In one example, the UE may receive the UL-CG configuration from a network node, where the UL-CG configuration includes a set of periodic resources, such as described in connection with FIG. 10. For example, at 1020, the first UE 1004 may receive an UL-CG configuration 1008 from the base station 1002, where the UL-CG configuration 1008 includes a set of periodic resources 1010. The reception of the UL-CG configuration may be performed by, e.g., the UL-CG/SL Tx configuration component 198, the cellular baseband processor 1324, and/or the transceiver(s) 1322 of the apparatus 1304 in FIG. 13.

In another example, transmitting the indication of the UL-CG configuration may include forwarding the UL-CG configuration received from the network node.

In another example, the indication includes a subset of parameters of the UL-CG configuration received from the network node.

In another example, the set of periodic resources is associated with a set of time and frequency resources and a periodicity for the at least one allocated UL transmission.

In another example, the UE corresponds to a transmitting SL UE and the at least one second UE corresponds to a receiving SL UE.

In another example, the UE may receive a configuration for an allowance to skip the at least one UL transmission from the network node, where at least one UL transmission is skipped based on the configuration for the allowance, such as described in connection with FIG. 10. For example, the first UE 1004 may receive a configuration for an allowance to skip the at least one UL transmission from the base station 1002, where at least one UL transmission is skipped based on the configuration for the allowance. The reception of the configuration for an allowance to skip the at least one UL transmission may be performed by, e.g., the UL-CG/SL Tx configuration component 198, the cellular baseband processor 1324, and/or the transceiver(s) 1322 of the apparatus 1304 in FIG. 13.

In another example, the UE may determine to skip the at least one UL transmission associated with the UL-CG configuration based on a slot type configured for the at least one UL transmission, where at least one UL transmission is skipped based on the determination, such as described in connection with FIG. 10. For example, at 1030, the first UE 1004 may determine to skip the at least one UL transmission associated with the UL-CG configuration 1008 based on a slot type configured for the at least one UL transmission, where at least one UL transmission is skipped based on the determination. The determination to skip the at least one UL transmission may be performed by, e.g., the UL-CG/SL Tx configuration component 198, the cellular baseband processor 1324, and/or the transceiver(s) 1322 of the apparatus

Figure 13:
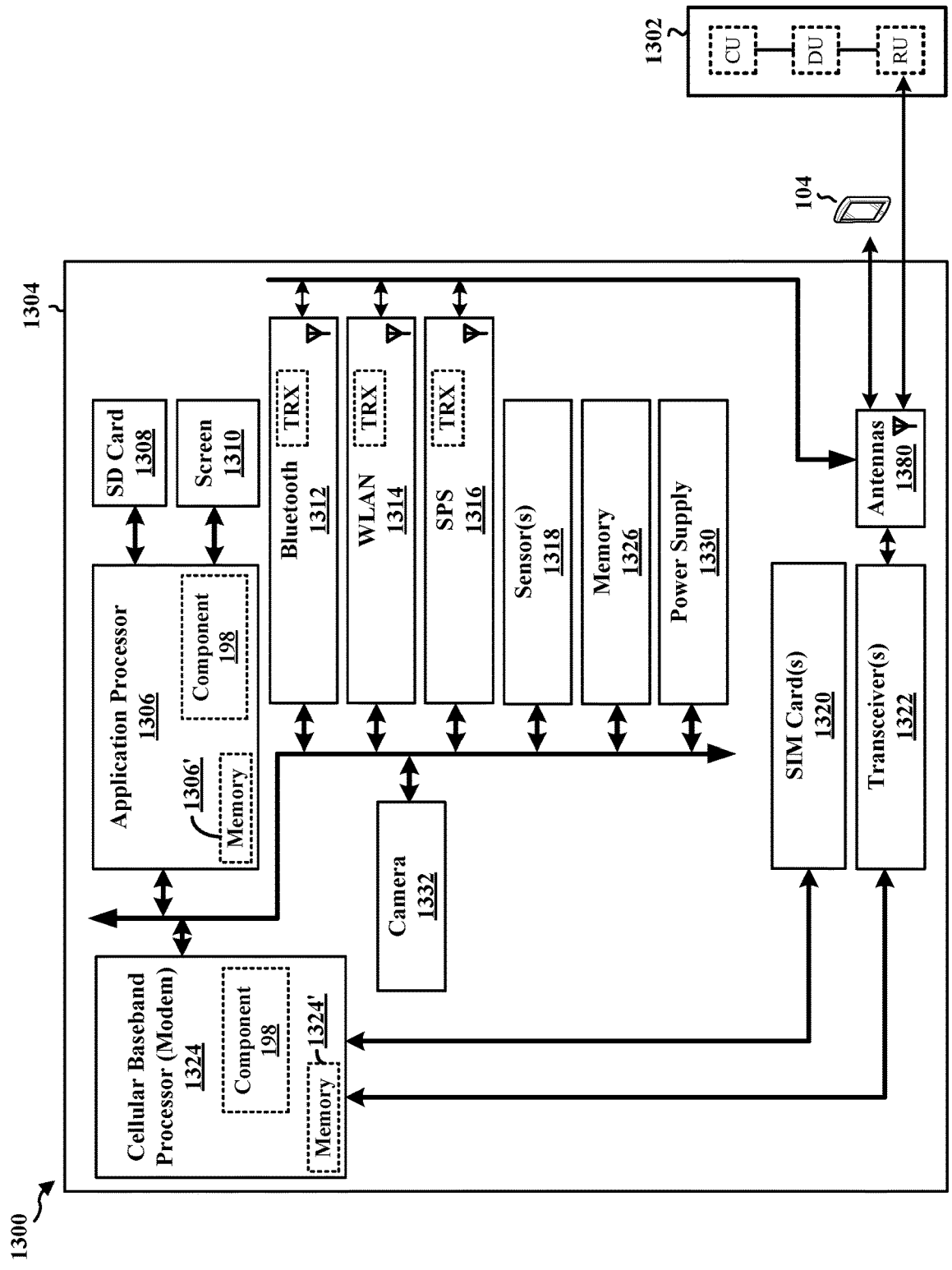
FIG. 13 is a diagram illustrating an example of a hardware implementation for an example apparatus and/or network entity.

1304 in FIG. 13. In one example, the slot type includes at least one of: an UL slot, a flexible slot, a full-duplex slot, or a half-duplex slot.

In another example, the UE may receive a configuration that configures one or more parameters for transmitting the SL transmission, where the one or more parameters are based on at least one configuration parameter of the UL-CG configuration, such as described in connection with FIG. 10. For example, the first UE 1004 may receive a configuration from the base station 1002 that configures one or more parameters for transmitting the SL transmission, where the one or more parameters are based on at least one configuration parameter of the UL-CG configuration 1008. The reception of the configuration that configures one or more parameters for transmitting the SL transmission may be performed by, e.g., the UL-CG/SL Tx configuration component 198, the cellular baseband processor 1324, and/or the transceiver(s) 1322 of the apparatus 1304 in FIG. 13. In one example, the one or more parameters include at least one of: a beam direction, a MCS, a bandwidth, or a Tx power for transmitting the SL transmission.

In another example, the at least one UL transmission is skipped based on a priority order between UL communication and SL communication. In such an example, a plurality of UL transmissions is skipped based on the SL transmission having a higher priority order than the plurality of UL transmissions.

In another example, the UE may transmit a second indication to the at least one second UE indicating the SL transmission, where the SL transmission is transmitted based on the second indication, such as described in connection with FIG. 10. For example, at 1028, the first UE 1004 may transmit an indication 1012 to the second UE 1006 indicating the SL transmission, where the SL transmission is transmitted to the second UE 1006 based on the indication 1012. The transmission of the second indication may be performed by, e.g., the UL-CG/SL Tx configuration component 198, the cellular baseband processor 1324, and/or the transceiver(s) 1322 of the apparatus 1304 in FIG. 13.

FIG. 13 is a diagram 1300 illustrating an example of a hardware implementation for an apparatus 1304. The apparatus 1304 may be a UE, a component of a UE, or may implement UE functionality. In some aspects, the apparatus 1304 may include a cellular baseband processor 1324 (also referred to as a modem) coupled to one or more transceivers 1322 (e.g., cellular RF transceiver). The cellular baseband processor 1324 may include on-chip memory 1324'. In some aspects, the apparatus 1304 may further include one or more subscriber identity modules (SIM) cards 1320 and an application processor 1306 coupled to a secure digital (SD) card 1308 and a screen 1310. The application processor 1306 may include on-chip memory 1306'. In some aspects, the apparatus 1304 may further include a Bluetooth module 1312, a WLAN module 1314, an SPS module 1316 (e.g., GNSS module), one or more sensor modules 1318 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize the antennas 1380 for communication. The cellular baseband processor 1324 communicates through the transceiver(s) 1322 via one or more antennas 1380 with the UE 104 and/or with an RU associated with a network entity 1302. The cellular baseband processor 1324 and the application processor 1306 may each include a computer-readable medium/memory 1324', 1306', respectively. The additional memory modules 1326 may also be considered a computer-readable medium/memory. Each computer-readable medium/memory 1324', 1306', 1326 may be non-transitory. The cellular baseband processor 1324 and the application processor 1306 are each responsible for general processing, including the execution of software stored on the computer-readable medium/memory. The software, when executed by the cellular baseband processor 1324/application processor 1306, causes the cellular baseband processor 1324/application processor 1306 to perform the various functions described supra. The computer-readable medium/memory may also be used for storing data that is manipulated by the cellular baseband processor 1324/application processor 1306 when executing software. The cellular baseband processor 1324/application processor 1306 may be a component of the UE 350 and may include the memory 360 and/or at least one of the TX processor 368, the RX processor 356, and the controller/processor 359. In one configuration, the apparatus 1304 may be a processor chip (modem and/or application) and include just the cellular baseband processor 1324 and/or the application processor 1306, and in another configuration, the apparatus 1304 may be the entire UE (e.g., see 350 of FIG. 3) and include the additional modules of the apparatus 1304.

As discussed supra, the UL-CG/SL Tx configuration component 198 is configured to transmit an indication of an UL-CG configuration including a set of periodic resources, where the UL-CG configuration corresponds to at least one allocated UL transmission for the first UE to a network node, where the indication is transmitted to at least one second UE. The UL-CG/SL Tx configuration component 198 may also be configured to skip at least one UL transmission associated with the UL-CG configuration, where the skipped at least one UL transmission corresponds to a subset of the set of periodic resources. The UL-CG/SL Tx configuration component 198 may also be configured to transmit a SL transmission to the at least one second UE using at least the subset of the set of periodic resources corresponding to the skipped at least one UL transmission associated with the UL-CG configuration. The UL-CG/SL Tx configuration component 198 may be within the cellular baseband processor 1324, the application processor 1306, or both the cellular baseband processor 1324 and the application processor 1306. The UL-CG/SL Tx configuration component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1304 may include a variety of components configured for various functions. In one configuration, the apparatus 1304, and in particular the cellular baseband processor 1324 and/or the application processor 1306, includes means for transmitting an indication of an UL-CG configuration including a set of periodic resources, where the UL-CG configuration corresponds to at least one allocated UL transmission for the first UE to a network node, where the indication is transmitted to at least one second UE. The apparatus 1304 may further include means for skipping at least one UL transmission associated with the UL-CG configuration, where the skipped at least one UL transmission corresponds to a subset of the set of periodic resources. The apparatus 1304 may further include means for transmitting a SL transmission to the at least one second UE using at least the subset of the set of periodic resources corresponding to the skipped at least one UL transmission associated with the UL-CG configuration.

In one example, the apparatus 1304 may further include means for receiving the UL-CG configuration from a network node, where the UL-CG configuration includes a set of periodic resources.

In another example, the means for transmitting the indication of the UL-CG configuration may include configuring the apparatus 1304 to forwarding the UL-CG configuration received from the network node.

In another example, the indication includes a subset of parameters of the UL-CG configuration received from the network node.

In another example, the set of periodic resources is associated with a set of time and frequency resources and a periodicity for the at least one allocated UL transmission.

In another example, the apparatus 1304 may further include means for receiving a configuration for an allowance to skip the at least one UL transmission from the network node, where at least one UL transmission is skipped based on the configuration for the allowance.

In another example, the apparatus 1304 may further include means for determining to skip the at least one UL transmission associated with the UL-CG configuration based on a slot type configured for the at least one UL transmission, where at least one UL transmission is skipped based on the determination. In such an example, the slot type includes at least one of: an UL slot, a flexible slot, a full-duplex slot, or a half-duplex slot.

In another example, the apparatus 1304 may further include means for receiving a configuration that configures one or more parameters for transmitting the SL transmission, where the one or more parameters are based on at least one configuration parameter of the UL-CG configuration. In such an example, the one or more parameters include at least one of: a beam direction, a MCS, a bandwidth, or a Tx power for transmitting the SL transmission.

In another example, the at least one UL transmission is skipped based on a priority order between UL communication and SL communication. In such an example, a plurality of UL transmissions is skipped based on the SL transmission having a higher priority order than the plurality of UL transmissions.

In another example, the apparatus 1304 may further include means for transmitting a second indication to the at least one second UE indicating the SL transmission, where the SL transmission is transmitted based on the second indication.

The means may be the UL-CG/SL Tx configuration component 198 of the apparatus 1304 configured to perform the functions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

Figure 14:
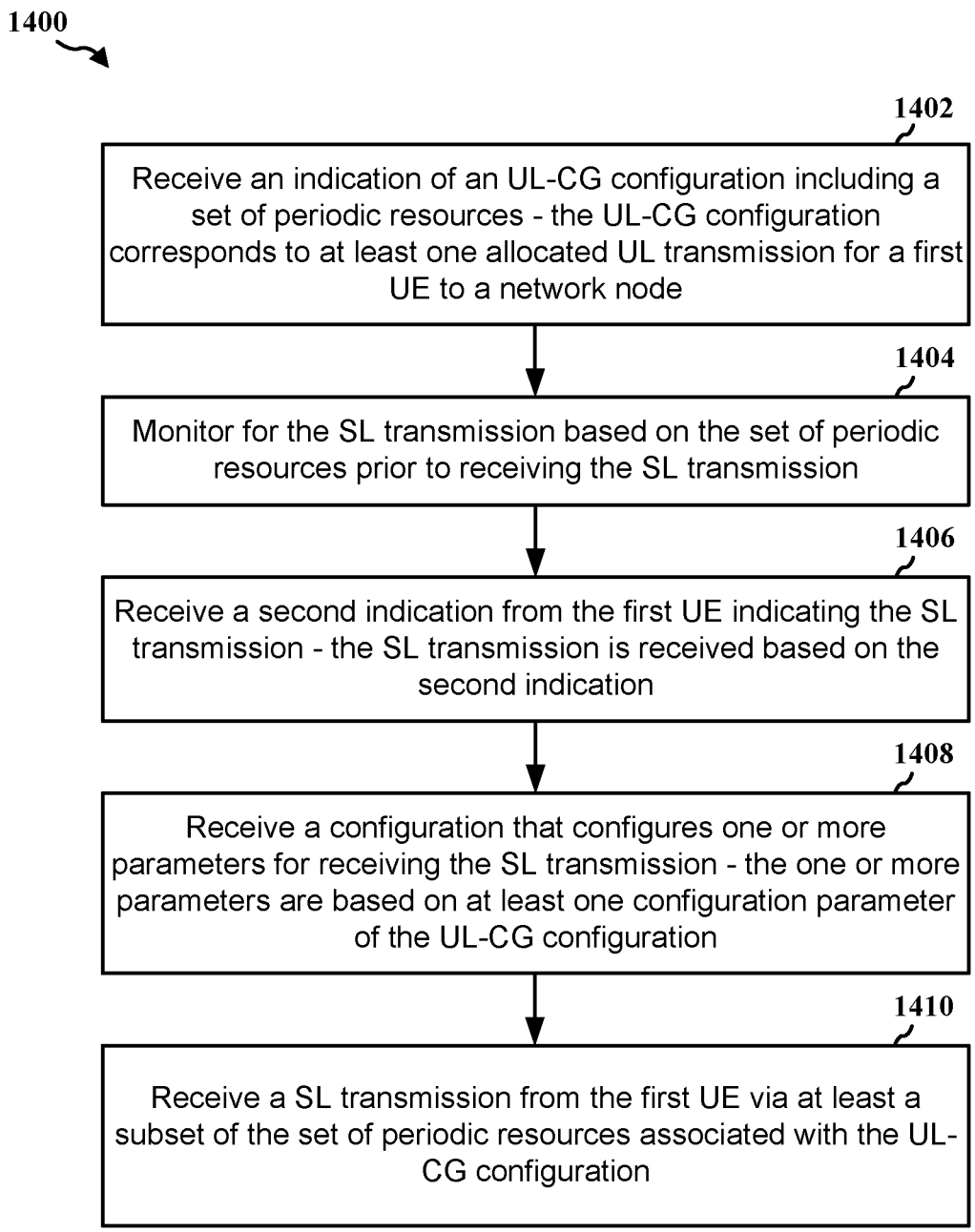
FIG. 14 is a flowchart of a method of wireless communication.

FIG. 14 is a flowchart 1400 of a method of wireless communication. The method may be performed by a UE (e.g., the UE 104, 402, 404, 406, 504, 506, 1006; the apparatus 1604). The method may enable the UE to receive SL communication from another UE via resources associated with one or more UL transmissions of an UL-CG.

At 1402, the UE may receive an indication of an UL-CG configuration including a set of periodic resources, where the UL-CG configuration corresponds to at least one allocated UL transmission for a first UE to a network node, such as described in connection with FIG. 10. For example, at 1022, the second UE 1006 may receive an UL-CG configuration 1008 or a portion of the UL-CG configuration 1008 from the base station 1002 and/or the first UE 1004, where the UL-CG configuration 1008 includes a set of periodic resources 1010 for the first UE 1004. The reception of the indication of the UL-CG configuration may be performed by, e.g., the SL process component 197, the cellular baseband processor 1624, and/or the transceiver(s) 1622 of the apparatus 1604 in FIG. 16.

In one example, the indication is received from the first UE via a second SL transmission or received from the network node via a UE-to-universal mobile telecommunications system (UMTS) terrestrial radio access network (UE-to-UTRAN) (Uu) link.

In another example, the indication includes a subset of parameters of the UL-CG configuration.

In another example, the set of periodic resources is associated with a set of time and frequency resources and a periodicity for the at least one allocated UL transmission.

In another example, the UE corresponds to a transmitting SL UE and the second UE corresponds to a receiving SL UE.

At 1404, the UE may monitor for the SL transmission based on the set of periodic resources prior to receiving the SL transmission, such as described in connection with FIG. 10. For example, at 1026, the second UE 1006 may monitor for SL transmission based on the UL-CG configuration 1008. The monitoring of the SL transmission may be performed by, e.g., the SL process component 197, the cellular baseband processor 1624, and/or the transceiver(s) 1622 of the apparatus 1604 in FIG. 16. In one example, monitoring for the SL transmission based on the set of periodic resources includes: monitoring all of the set of periodic resources, monitoring a second subset of the set of periodic resources, or monitoring at least one periodic resource in the set of periodic resources associated with the UL-CG configuration.

At 1406, the UE may receive a second indication from the first UE indicating the SL transmission, where the SL transmission is received based on the second indication, such as described in connection with FIG. 10. For example, at 1028, the second UE 1006 may receive an indication 1012 indicating a sidelink transmission from the first UE 1004. The reception of the indication of the SL transmission may be performed by, e.g., the SL process component 197, the cellular baseband processor 1624, and/or the transceiver(s) 1622 of the apparatus 1604 in FIG. 16.

At 1408, the UE may receive a configuration that configures one or more parameters for receiving the SL transmission, where the one or more parameters are based on at least one configuration parameter of the UL-CG configuration, such as described in connection with FIG. 10. For example, the second UE 1006 may receive a configuration that configures one or more parameters for receiving the SL transmission, where the one or more parameters are based on at least one configuration parameter of the UL-CG configuration. The reception of the configuration that configures one or more parameters for receiving the SL transmission may be performed by, e.g., the SL process component 197, the cellular baseband processor 1624, and/or the transceiver(s) 1622 of the apparatus 1604 in FIG. 16. In one example, the one or more parameters include at least one of: a beam direction, a MCS, a bandwidth, or a reception (Rx) power for receiving the SL transmission.

At 1410, the UE may receive a SL transmission from the first UE via at least a subset of the set of periodic resources associated with the UL-CG configuration, such as described in connection with FIG. 10. For example, at 1032, the second UE 1006 may receive a SL transmission from the first UE 1004 via at least a subset of the set of periodic resources 1010 associated with the UL-CG configuration 1008. The reception of the SL transmission may be performed by, e.g., the SL process component 197, the cellular baseband processor 1624, and/or the transceiver(s) 1622 of the apparatus 1604 in FIG. 16.

Figure 15:
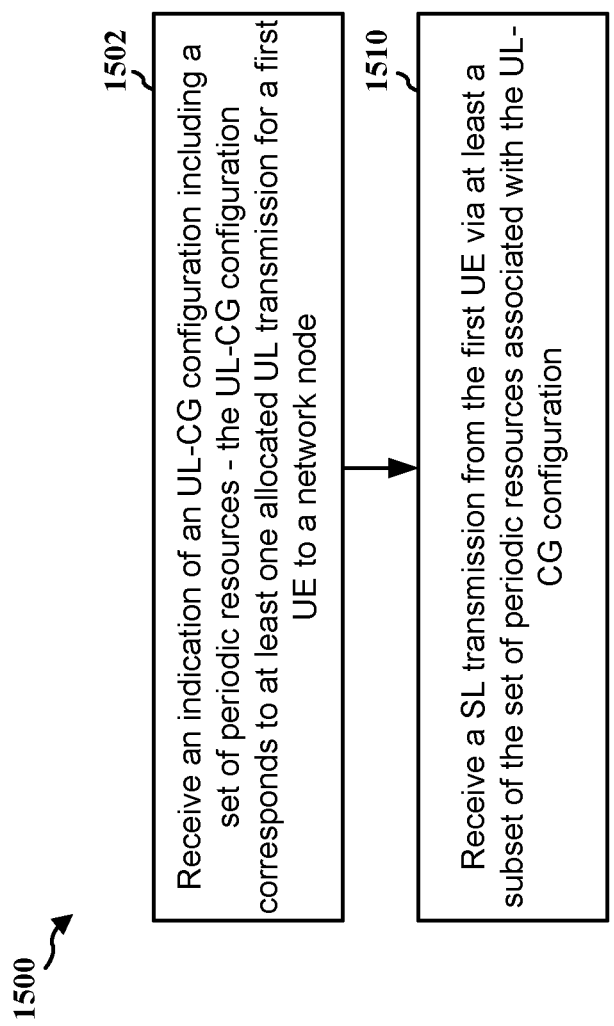
FIG. 15 is a flowchart of a method of wireless communication.

FIG. 15 is a flowchart 1500 of a method of wireless communication. The method may be performed by a UE (e.g., the UE 104, 402, 404, 406, 504, 506, 1006; the apparatus 1604). The method may enable the UE (e.g., a first UE) to receive SL communication from another UE (e.g., a second UE) via resources associated with one or more UL transmissions of an UL-CG configured for the another UE.

At 1502, the UE may receive an indication of an UL-CG configuration including a set of periodic resources, where the UL-CG configuration corresponds to at least one allocated UL transmission for a first UE to a network node, such as described in connection with FIG. 10. For example, at 1022, the second UE 1006 may receive an UL-CG configuration 1008 or a portion of the UL-CG configuration 1008 from the base station 1002 and/or the first UE 1004, where the UL-CG configuration 1008 includes a set of periodic resources 1010 for the first UE 1004. The reception of the indication of the UL-CG configuration may be performed by, e.g., the SL process component 197, the cellular baseband processor 1624, and/or the transceiver(s) 1622 of the apparatus 1604 in FIG. 16.

At 1510, the UE may receive a SL transmission from the first UE via at least a subset of the set of periodic resources associated with the UL-CG configuration, such as described in connection with FIG. 10. For example, at 1032, the second UE 1006 may receive a SL transmission from the first UE 1004 via at least a subset of the set of periodic resources 1010 associated with the UL-CG configuration 1008. The reception of the SL transmission may be performed by, e.g., the SL process component 197, the cellular baseband processor 1624, and/or the transceiver(s) 1622 of the apparatus 1604 in FIG. 16.

In one example, the indication is received from the first UE via a second SL transmission or received from the network node via a Uu link.

In another example, the indication includes a subset of parameters of the UL-CG configuration.

In another example, the set of periodic resources is associated with a set of time and frequency resources and a periodicity for the at least one allocated UL transmission.

In another example, the UE corresponds to a transmitting SL UE and the second UE corresponds to a receiving SL UE.

In another example, the UE may monitor for the SL transmission based on the set of periodic resources prior to receiving the SL transmission, such as described in connection with FIG. 10. For example, at 1026, the second UE 1006 may monitor for SL transmission based on the UL-CG configuration 1008. The monitoring of the SL transmission may be performed by, e.g., the SL process component 197, the cellular baseband processor 1624, and/or the transceiver (s) 1622 of the apparatus 1604 in FIG. 16. In such an example, monitoring for the SL transmission based on the set of periodic resources includes: monitoring all of the set of periodic resources, monitoring a second subset of the set of periodic resources, or monitoring at least one periodic resource in the set of periodic resources associated with the UL-CG configuration.

In another example, the UE may receive a second indication from the first UE indicating the SL transmission, where the SL transmission is received based on the second indication, such as described in connection with FIG. 10. For example, at 1028, the second UE 1006 may receive an indication 1012 indicating a sidelink transmission from the first UE 1004. The reception of the indication of the SL transmission may be performed by, e.g., the SL process component 197, the cellular baseband processor 1624, and/ or the transceiver(s) 1622 of the apparatus 1604 in FIG. 16.

In another example, the UE may receive a configuration that configures one or more parameters for receiving the SL transmission, where the one or more parameters are based on at least one configuration parameter of the UL-CG configuration, such as described in connection with FIG. 10. For example, the second UE 1006 may receive a configuration that configures one or more parameters for receiving the SL transmission, where the one or more parameters are based on at least one configuration parameter of the UL-CG configuration. The reception of the configuration that configures one or more parameters for receiving the SL transmission may be performed by, e.g., the SL process component 197, the cellular baseband processor 1624, and/or the transceiver(s) 1622 of the apparatus 1604 in FIG. 16. In such an example, the one or more parameters include at least one of: a beam direction, a MCS, a bandwidth, or a reception (Rx) power for receiving the SL transmission.

Figure 16:
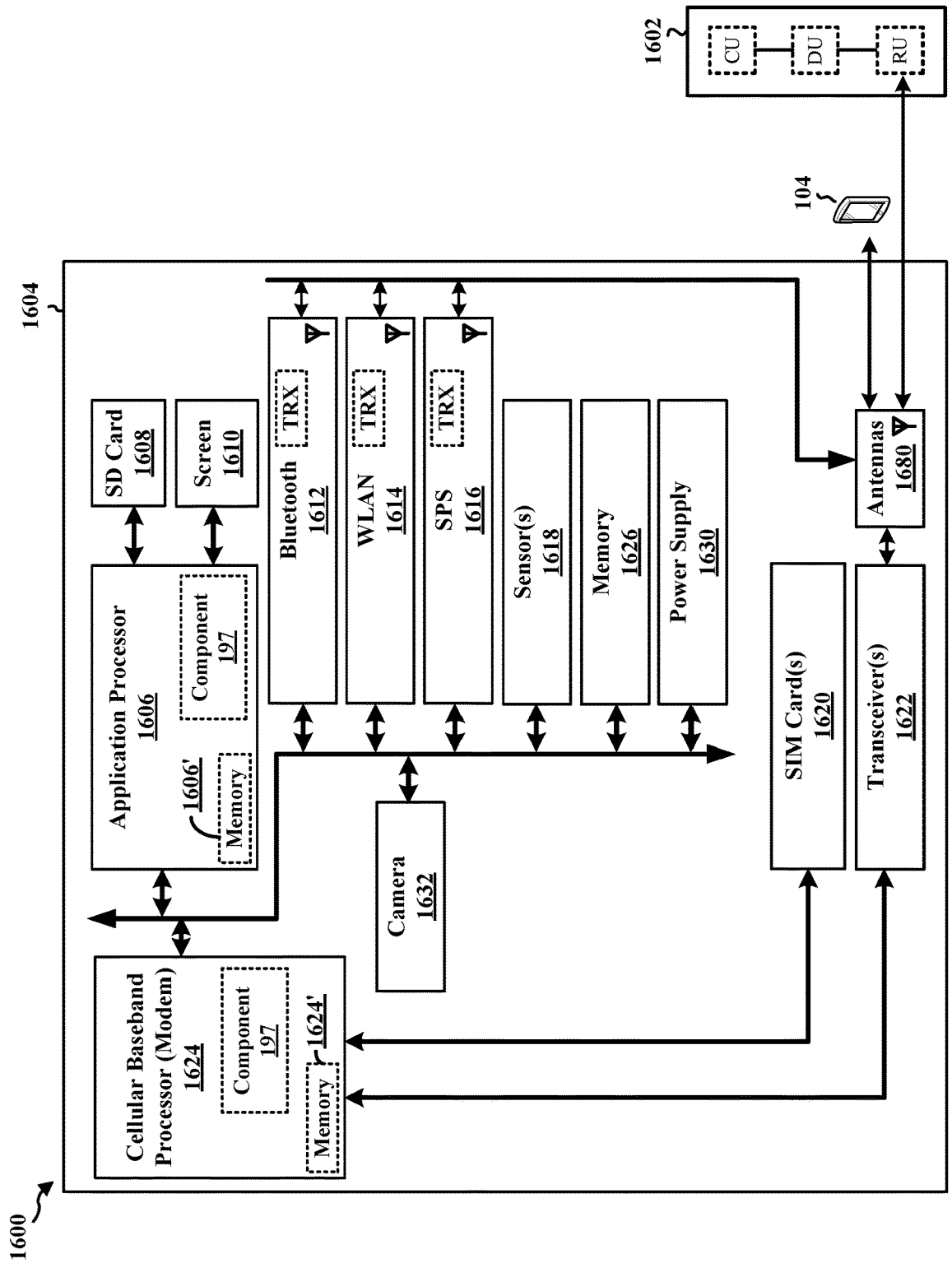
FIG. 16 is a diagram illustrating an example of a hardware implementation for an example apparatus and/or network entity.

FIG. 16 is a diagram 1600 illustrating an example of a hardware implementation for an apparatus 1604. The apparatus 1604 may be a UE, a component of a UE, or may implement UE functionality. In some aspects, the apparatus 1604 may include a cellular baseband processor 1624 (also referred to as a modem) coupled to one or more transceivers 1622 (e.g., cellular RF transceiver). The cellular baseband processor 1624 may include on-chip memory 1624'. In some aspects, the apparatus 1604 may further include one or more subscriber identity modules (SIM) cards 1620 and an application processor 1606 coupled to a secure digital (SD) card 1608 and a screen 1610. The application processor 1606 may include on-chip memory 1606'. In some aspects, the apparatus 1604 may further include a Bluetooth module 1612, a WLAN module 1614, an SPS module 1616 (e.g., GNSS module), one or more sensor modules 1618 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1626, a power supply 1630, and/or a camera 1632. The Bluetooth module 1612, the WLAN module 1614, and the SPS module 1616 may include an on-chip transceiver (TRX) (or in some cases, just a receiver (RX)). The Bluetooth module 1612, the WLAN module 1614, and the SPS module 1616 may include their own dedicated antennas and/or utilize the antennas 1680 for communication. The cellular baseband processor 1624 communicates through the transceiver(s) 1622 via one or more antennas 1680 with the UE 104 and/or with an RU associated with a network entity 1602. The cellular baseband processor 1624 and the application processor 1606 may each include a computer-readable medium/memory 1624', 1606', respectively. The additional memory modules 1626 may also be considered a computer-readable medium/memory. Each computer-readable medium/memory 1624', 1606', 1626 may be non-transitory. The cellular baseband processor 1624 and the application processor 1606 are each responsible for general processing, including the execution of software stored on the computer-readable medium/memory. The software, when executed by the cellular baseband processor 1624/application processor 1606, causes the cellular baseband processor 1624/application processor 1606 to perform the various functions described supra. The computer-readable medium/memory may also be used for storing data that is manipulated by the cellular baseband processor 1624/application processor 1606 when executing software. The cellular baseband processor 1624/application processor 1606 may be a component of the UE 350 and may include the memory 360 and/or at least one of the TX processor 368, the RX processor 356, and the controller/processor 359. In one configuration, the apparatus 1604 may be a processor chip (modem and/or application) and include just the cellular baseband processor 1624 and/or the application processor 1606, and in another configuration, the apparatus 1604 may be the entire UE (e.g., see 350 of FIG. 3) and include the additional modules of the apparatus 1604.

As discussed supra, the SL process component 197 is configured to receive an indication of an UL-CG configuration including a set of periodic resources, where the UL-CG configuration corresponds to at least one allocated UL transmission for a first UE to a network node. The SL process component 197 may also be configured to receive a SL transmission from the first UE via at least a subset of the set of periodic resources associated with the UL-CG configuration. The SL process component 197 may be within the cellular baseband processor 1624, the application processor 1606, or both the cellular baseband processor 1624 and the application processor 1606. The SL process component 197 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1604 may include a variety of components configured for various functions. In one configuration, the apparatus 1604, and in particular the cellular baseband processor 1624 and/or the application processor 1606, includes means for receiving an indication of an UL-CG configuration including a set of periodic resources, where the UL-CG configuration corresponds to at least one allocated UL transmission for a first UE to a network node. The apparatus 1604 may further include means for receiving a SL transmission from the first UE via at least a subset of the set of periodic resources associated with the UL-CG configuration.

In one example, the indication is received from the first UE via a second SL transmission or received from the network node via a Uu link.

In another example, the indication includes a subset of parameters of the UL-CG configuration.

In another example, the set of periodic resources is associated with a set of time and frequency resources and a periodicity for the at least one allocated UL transmission.

In another example, the UE corresponds to a transmitting SL UE and the second UE corresponds to a receiving SL UE.

In another example, the apparatus 1604 may further include means for monitoring for the SL transmission based on the set of periodic resources prior to receiving the SL transmission. In such an example, the means for monitoring for the SL transmission based on the set of periodic resources includes configuring the apparatus 1604 to monitor all of the set of periodic resources, monitor a second subset of the set of periodic resources, or monitor at least one periodic resource in the set of periodic resources associated with the UL-CG configuration.

In another example, the apparatus 1604 may further include means for receiving a second indication from the first UE indicating the SL transmission, where the SL transmission is received based on the second indication.

In another example, the apparatus 1604 may further include means for receiving a configuration that configures one or more parameters for receiving the SL transmission, where the one or more parameters are based on at least one configuration parameter of the UL-CG configuration. In such an example, the one or more parameters include at least one of: a beam direction, a MCS, a bandwidth, or an Rx power for receiving the SL transmission.

The means may be the SL process component 197 of the apparatus 1604 configured to perform the functions recited by the means. As described supra, the apparatus 1604 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first UE, including: transmitting an indication of an UL-CG configuration including a set of periodic resources, where the UL-CG configuration corresponds to at least one allocated UL transmission for the first UE to a network node, where the indication is transmitted to at least one second UE; skipping at least one UL transmission associated with the UL-CG configuration, where the skipped at least one UL transmission corresponds to a subset of the set of periodic resources; and transmitting a SL transmission to the at least one second UE using at least the subset of the set of periodic resources corresponding to the skipped at least one UL transmission associated with the UL-CG configuration.

Aspect 2 is the method of aspect 1, further including: receiving the UL-CG configuration from the network node, where the UL-CG configuration includes the set of periodic resources.

Aspect 3 is the method of aspect 2, where transmitting the indication of the UL-CG configuration includes forwarding the UL-CG configuration received from the network node.

Aspect 4 is the method of aspect 2, where the indication includes a subset of parameters of the UL-CG configuration received from the network node.

Aspect 5 is the method of any of aspects 1 to 4, further including: transmitting a second indication to the at least one second UE indicating the SL transmission, where the SL transmission is transmitted based on the second indication.

Aspect 6 is the method of any of aspects 1 to 5, further including: receiving a configuration for an allowance to skip the at least one UL transmission from the network node, where the at least one UL transmission is skipped based on the configuration for the allowance.

Aspect 7 is the method of any of aspects 1 to 6, where the at least one UL transmission is skipped based on a priority order between UL communication and SL communication.

Aspect 8 is the method of aspect 7, where a plurality of UL transmissions is skipped based on the SL transmission having a higher priority order than the plurality of UL transmissions.

Aspect 9 is the method of any of aspects 1 to 8, further including: determining to skip the at least one UL transmission associated with the UL-CG configuration based on a slot type configured for the at least one UL transmission, where the at least one UL transmission is skipped based on the determination.

Aspect 10 is the method of aspect 9, where the slot type includes at least one of: an UL slot, a FL slot, a FD slot, or a HD slot.

Aspect 11 is the method of any of aspects 1 to 10, further including: receiving a configuration that configures one or more parameters for transmitting the SL transmission, where the one or more parameters are based on at least one configuration parameter of the UL-CG configuration.

Aspect 12 is the method of aspect 11, where the one or more parameters include at least one of: a beam direction, a MCS, a bandwidth, or a Tx power for transmitting the SL transmission.

Aspect 13 is the method of any of aspects 1 to 12, where the set of periodic resources is associated with a set of time and frequency resources and a periodicity for the at least one allocated UL transmission.

Aspect 14 is the method of any of aspects 1 to 13, where the first UE corresponds to a transmitting SL UE and the at least one second UE corresponds to a receiving SL UE.

Aspect 15 is an apparatus for wireless communication at a first UE, including: a memory; and at least one processor coupled to the memory and, based at least in part on information stored in the memory, the at least one processor is configured to implement any of aspects 1 to 14.

Aspect 16 is the apparatus of aspect 14, further including at least one of a transceiver or an antenna coupled to the at least one processor.

Aspect 17 is an apparatus for wireless communication including means for implementing any of aspects 1 to 14.

Aspect 18 is a computer-readable medium (e.g., a non-transitory computer-readable medium) storing computer executable code, where the code when executed by a processor causes the processor to implement any of aspects 1 to 14.

Aspect 19 is a method of wireless communication at a second UE, including: receiving an indication of an UL-CG configuration including a set of periodic resources, where the UL-CG configuration corresponds to at least one allocated UL transmission for a first UE to a network node; and receiving a SL transmission from the first UE via at least a subset of the set of periodic resources associated with the UL-CG configuration.

Aspect 20 is the method of aspect 19, where the indication is received from the first UE via a second SL transmission or received from the network node via a Uu link.

Aspect 21 is the method of aspect 19 or 20, further including: monitoring for the SL transmission based on the set of periodic resources prior to receiving the SL transmission.

Aspect 22 is the method of aspect 21, where monitoring for the SL transmission based on the set of periodic resources includes: monitoring all of the set of periodic resources, monitoring a second subset of the set of periodic resources, or monitoring at least one periodic resource in the set of periodic resources associated with the UL-CG configuration.

Aspect 23 is the method of any of the aspects 19 to 22, where the indication includes a subset of parameters of the UL-CG configuration.

Aspect 24 is the method of any of the aspects 19 to 23, further including: receiving a second indication from the first UE indicating the SL transmission, where the SL transmission is received based on the second indication.

Aspect 25 is the method of any of the aspects 19 to 24, further including: receiving a configuration that configures one or more parameters for receiving the SL transmission, where the one or more parameters are based on at least one configuration parameter of the UL-CG configuration.

Aspect 26 is the method of aspect 25, where the one or more parameters include at least one of: a beam direction, a MCS, a bandwidth, or an Rx power for receiving the SL transmission.

Aspect 27 is the method of any of the aspects 19 to 26, where the set of periodic resources is associated with a set of time and frequency resources and a periodicity for the at least one allocated UL transmission.

Aspect 28 is the method of any of the aspects 19 to 27, where the first UE corresponds to a transmitting SL UE and the second UE corresponds to a receiving SL UE.

Aspect 29 is an apparatus for wireless communication at a second UE, including: a memory; and at least one processor coupled to the memory and, based at least in part on information stored in the memory, the at least one processor is configured to implement any of aspects 19 to 28.

Aspect 30 is the apparatus of aspect 31, further including at least one of a transceiver or an antenna coupled to the at least one processor.

Aspect 31 is an apparatus for wireless communication including means for implementing any of aspects 19 to 28.

Aspect 32 is a computer-readable medium (e.g., a non-transitory computer-readable medium) storing computer executable code, where the code when executed by a processor causes the processor to implement any of aspects 19 to 28.

What is claimed is:

1. An apparatus for wireless communication at a first user equipment (UE), comprising:
at least one memory; and
at least one processor coupled to the at least one memory, wherein the at least one processor is configured to:
transmit an indication of an uplink (UL)-configured grant (CG) (UL-CG) configuration including a set of periodic resources, wherein the UL-CG configuration corresponds to at least one allocated UL transmission for the first UE to a network node, wherein the indication is transmitted to at least one second UE;
receive, from the network node, a configuration for an allowance to skip at least one UL transmission associated with the UL-CG configuration;
skip the at least one UL transmission associated with the UL-CG configuration based on the configuration, wherein the skipped at least one UL transmission corresponds to a subset of the set of periodic resources; and
transmit a sidelink (SL) transmission to the at least one second UE using at least the subset of the set of periodic resources corresponding to the skipped at least one UL transmission associated with the UL-CG configuration.

2. The apparatus of claim 1, wherein the at least one processor is configured to:
receive the UL-CG configuration from the network node, wherein the UL-CG configuration includes the set of periodic resources.

3. The apparatus of claim 2, wherein to transmit the indication of the UL-CG configuration, the at least one processor is configured to forward the UL-CG configuration received from the network node.

4. The apparatus of claim 2, wherein the indication includes a subset of parameters of the UL-CG configuration received from the network node.

5. The apparatus of claim 1, wherein the at least one processor is configured to:
transmit a second indication to the at least one second UE indicating the SL transmission, wherein the SL transmission is transmitted based on the second indication.

6. The apparatus of claim 1, wherein the at least one UL transmission is skipped based on a priority order between UL communication and SL communication.

7. The apparatus of claim 6, wherein a plurality of UL transmissions is skipped based on the SL transmission having a higher priority order than the plurality of UL transmissions.

8. The apparatus of claim 1, wherein the at least one processor is configured to:
determine to skip the at least one UL transmission associated with the UL-CG configuration based on a slot type configured for the at least one UL transmission, wherein the at least one UL transmission is skipped based on the determination.

9. The apparatus of claim 8, wherein the slot type includes at least one of:
an UL slot,
a flexible (FL) slot,
a full-duplex (FD) slot, or
a half-duplex (HD) slot.

10. The apparatus of claim 1, wherein the at least one processor is configured to:
receive a configuration that configures one or more parameters for transmitting the SL transmission, wherein the one or more parameters are based on at least one configuration parameter of the UL-CG configuration.

11. The apparatus of claim 10, wherein the one or more parameters include at least one of: a beam direction, a modulation coding scheme (MCS), a bandwidth, or a transmission (Tx) power for transmitting the SL transmission.

12. The apparatus of claim 1, wherein the set of periodic resources is associated with a set of time and frequency resources and a periodicity for the at least one allocated UL transmission.

13. A method of wireless communication at a first user equipment (UE), comprising:

transmitting an indication of an uplink (UL)-configured grant (CG) (UL-CG) configuration including a set of periodic resources, wherein the UL-CG configuration corresponds to at least one allocated UL transmission for the first UE to a network node, wherein the indication is transmitted to at least one second UE;

receiving, from the network node, a configuration for an allowance to skip at least one UL transmission associated with the UL-CG configuration;

skipping the at least one UL transmission associated with the UL-CG configuration based on the configuration, wherein the skipped at least one UL transmission corresponds to a subset of the set of periodic resources; and transmitting a sidelink (SL) transmission to the at least one second UE using at least the subset of the set of periodic resources corresponding to the skipped at least one UL transmission associated with the UL-CG configuration.

14. The method of claim 13, further comprising:
receiving the UL-CG configuration from the network node, wherein the UL-CG configuration includes the set of periodic resources.

15. The method of claim 13, further comprising:
transmitting a second indication to the at least one second UE indicating the SL transmission, wherein the SL transmission is transmitted based on the second indication.

16. The method of claim 13, further comprising:
determining to skip the at least one UL transmission associated with the UL-CG configuration based on a slot type configured for the at least one UL transmission, wherein the at least one UL transmission is skipped based on the determination.

17. The method of claim 13, further comprising:
receiving a configuration that configures one or more parameters for transmitting the SL transmission, wherein the one or more parameters are based on at least one configuration parameter of the UL-CG configuration.

18. The method of claim 17, wherein the one or more parameters include at least one of: a beam direction, a modulation coding scheme (MCS), a bandwidth, or a transmission (Tx) power for transmitting the SL transmission.

19. An apparatus for wireless communication at a second user equipment (UE), comprising:
at least one memory; and
at least one processor coupled to the at least one memory, wherein the at least one processor is configured to:
receive an indication of an uplink (UL)-configured grant (CG) (UL-CG) configuration including a set of periodic resources, wherein the UL-CG configuration corresponds to at least one allocated UL transmission for a first UE to a network node;
receive a second indication from the first UE indicating a sidelink (SL) transmission using at least a subset of the set of periodic resources associated with the UL-CG configuration; and
receive, based on the second indication, the SL transmission from the first UE via at least the subset of the set of periodic resources associated with the UL-CG configuration wherein at least one UL transmission is skipped.

20. The apparatus of claim 19, wherein the indication is received from the first UE via a second SL transmission or received from the network node via a UE-to-universal mobile telecommunications system (UMTS) terrestrial radio access network (UE-to-UTRAN) (Uu) link.

21. The apparatus of claim 19, wherein the at least one processor is configured to:
monitor for the SL transmission based on the set of periodic resources prior to receiving the SL transmission.

22. The apparatus of claim 21, wherein to monitoring for the SL transmission based on the set of periodic resources, the at least one processor is configured to:
monitor all of the set of periodic resources,
monitor a second subset of the set of periodic resources, or
monitor at least one periodic resource in the set of periodic resources associated with the UL-CG configuration.

23. The apparatus of claim 19, wherein the indication includes a subset of parameters of the UL-CG configuration.

24. The apparatus of claim 19, wherein the at least one processor is configured to:
receive a configuration that configures one or more parameters for receiving the SL transmission, wherein the one or more parameters are based on at least one configuration parameter of the UL-CG configuration.

25. The apparatus of claim 24, wherein the one or more parameters include at least one of: a beam direction, a modulation coding scheme (MCS), a bandwidth, or a reception (Rx) power for receiving the SL transmission.

26. The apparatus of claim 19, wherein the set of periodic resources is associated with a set of time and frequency resources and a periodicity for the at least one allocated UL transmission.

27. A method of wireless communication at a second user equipment (UE), comprising:
receiving an indication of an uplink (UL)-configured grant (CG) (UL-CG) configuration including a set of periodic resources, wherein the UL-CG configuration corresponds to at least one allocated UL transmission for a first UE to a network node;
receiving a second indication from the first UE indicating a sidelink (SL) transmission using at least a subset of the set of periodic resources associated with the UL-CG configuration;
and receiving, based on the second indication, the SL transmission from the first UE via at least a the subset of the set of periodic resources associated with the UL-CG configuration wherein at least one UL transmission is skipped.

* * * * *